(12) United States Patent
Ellis

(10) Patent No.: US 9,173,003 B2
(45) Date of Patent: *Oct. 27, 2015

(54) MEDIA SYSTEM WITH INTERNET CONTENT

(71) Applicant: Rovi Guides, Inc., Santa Clara, CA (US)

(72) Inventor: Michael D. Ellis, Boulder, CO (US)

(73) Assignee: Rovi Guides, Inc., Santa Clara, CA (US)

( * ) Notice: Subject to any disclaimer, the term of this patent is extended or adjusted under 35 U.S.C. 154(b) by 74 days.

This patent is subject to a terminal disclaimer.

(21) Appl. No.: 14/060,222

(22) Filed: Oct. 22, 2013

(65) Prior Publication Data

US 2014/0047476 A1    Feb. 13, 2014

Related U.S. Application Data

(63) Continuation of application No. 12/559,955, filed on Sep. 15, 2009, now Pat. No. 8,589,978, which is a continuation of application No. 09/605,683, filed on Jun. 26, 2000, now abandoned.

(60) Provisional application No. 60/141,501, filed on Jun. 28, 1999, provisional application No. 60/144,695, filed on Jul. 20, 1999.

(51) Int. Cl.
*H04N 5/445* (2011.01)
*H04N 21/482* (2011.01)
(Continued)

(52) U.S. Cl.
CPC ...... *H04N 21/4828* (2013.01); *G06F 17/30023* (2013.01); *H04N 5/44543* (2013.01); *H04N 5/44591* (2013.01); *H04N 7/165* (2013.01); *H04N 7/17318* (2013.01); *H04N 21/222* (2013.01); *H04N 21/4622* (2013.01); *H04N 21/478* (2013.01); *H04N 21/4782* (2013.01); *H04N 21/4786* (2013.01);
(Continued)

(58) Field of Classification Search
CPC .................................................. H04N 21/4332
USPC ......................................... 725/48, 49, 51, 52
See application file for complete search history.

(56) References Cited

U.S. PATENT DOCUMENTS 5,617,565 A    4/1997    Augenbraun et al.
5,694,163 A    12/1997   Harrison
(Continued)

FOREIGN PATENT DOCUMENTS

DE    4201031 A1    7/1993
DE    4410547 A1    10/1995
(Continued)

*Primary Examiner* — Dominic D Saltarelli
(74) *Attorney, Agent, or Firm* — Ropes & Gray LLP

(57) ABSTRACT

An interactive television system is provided that supports newsgroup features. An interactive television application, such as an interactive television program guide, may be used to allow a user to view and post newsgroup messages to one or more newsgroup servers. The newsgroup servers may be located at a television distribution facility. The newsgroup servers may be Usenet servers accessed via the Internet. The user may use the newsgroup feature while watching television programming or while otherwise viewing other content provided by the interactive television application. Cross-referencing may be used to allow the user to access content related to a particular subject matter. Parental control features may be used to limit access to certain newsgroups. Newsgroup messages may contain links to other content made available through the interactive television application.

20 Claims, 46 Drawing Sheets

(51) Int. Cl.
*H04N 7/16* (2011.01)
*H04N 7/173* (2011.01)
*H04N 21/222* (2011.01)
*H04N 21/462* (2011.01)
*H04N 21/478* (2011.01)
*H04N 21/4782* (2011.01)
*H04N 21/4786* (2011.01)
*H04N 21/4788* (2011.01)
*H04N 21/488* (2011.01)
*H04N 21/658* (2011.01)
*H04N 21/81* (2011.01)
*H04N 21/84* (2011.01)
*H04N 21/858* (2011.01)
*G06F 17/30* (2006.01)

(52) U.S. Cl.
CPC ...... *H04N 21/4788* (2013.01); *H04N 21/4882* (2013.01); *H04N 21/6582* (2013.01); *H04N 21/812* (2013.01); *H04N 21/8126* (2013.01); *H04N 21/84* (2013.01); *H04N 21/8586* (2013.01)

(56) References Cited

U.S. PATENT DOCUMENTS

| | | |
|---|---|---|
| 5,774,666 A | 6/1998 | Portuesi |
| 5,819,032 A | 10/1998 | de Vries et al. |
| 5,819,269 A | 10/1998 | Uomini |
| 5,828,839 A | 10/1998 | Moncreiff |
| 5,881,131 A | 3/1999 | Farris et al. |
| 5,987,606 A | 11/1999 | Cirasole et al. |
| 5,988,078 A | 11/1999 | Levine |
| 5,991,799 A | 11/1999 | Yen et al. |
| 5,996,011 A | 11/1999 | Humes |
| 6,025,837 A | 2/2000 | Matthews, III et al. |
| 6,141,678 A | 10/2000 | Britt, Jr. |
| 6,172,677 B1 | 1/2001 | Stautner et al. |
| 6,177,931 B1 | 1/2001 | Alexander et al. |
| 6,374,290 B1 | 4/2002 | Scharber et al. |
| 6,388,714 B1 | 5/2002 | Schein et al. |
| 6,631,523 B1 | 10/2003 | Matthews et al. |
| 2002/0059526 A1 | 5/2002 | Dillon et al. |

FOREIGN PATENT DOCUMENTS

| | | |
|---|---|---|
| DE | 19754269 A1 | 6/1999 |
| EP | 0 083 498 A2 | 7/1983 |
| EP | 0 851 681 | 12/1997 |
| EP | 0 834 798 | 4/1998 |
| EP | 0 849 946 A2 | 6/1998 |
| EP | 0 852 443 A2 | 7/1998 |
| JP | 10162028 A | 6/1998 |
| WO | WO-9741690 A1 | 11/1997 |
| WO | WO-98/26584 A1 | 6/1998 |
| WO | WO-99/04561 A1 | 1/1999 |
| WO | WO-9916226 A1 | 4/1999 |
| WO | WO-9952036 A1 | 10/1999 |

| NEWSGROUP | NUMBER OF MESSAGES | UNREAD MESSAGES | TYPE |
|---|---|---|---|
| ALT. TV. SHOW. X-FILES | 2537 | 10 | USENET |
| ALT. FAN. MULDER | 1003 | 245 | USENET |
| ALT. FAN. SCULLY | 5037 | 5037 | USENET |
| ALT. FBI | 347 | 23 | USENET |
| ALT. CONSPIRACY. ALIENS | 58 | 0 | USENET |
| X-FILES | 259 | 5 | TVGUIDE |

FIG. 6B

ALT. FAN. MULDER

WATCH THE GOLDEN GIRLS

| SUBJECT | DATE | SENDER |
|---|---|---|
| I THINK MULDER IS RIGHT!!! | 2/20/00 | DOE@DOE.COM |
| I AGREE | 2/20/00 | ROE@ROE.COM |
| YOU'RE CRAZY | 2/21/00 | JOHN |
| NO, YOU'RE CRAZY! | 2/22/00 | DOE@DOE.COM |
| HE FOUND THE CONSPIRACY... | 2/20/00 | JANE@DOE.COM |
| WHAT CONSPIRACY? | 2/21/00 | LUVXFILES |
| MULDER IS SMARTER THAN SCULLY | 2/20/00 | X-FILE FAN |
| WHY? | 2/20/00 | WHY NOT |
| RE: MULDER IS SMARTER... | 2/20/00 | THE@THE.COM |

FIG. 8

| RATING | DESCRIPTION |
|---|---|
| G | GENERAL AUDIENCE |
| N14 | SUITABLE FOR 14 AND OVER |
| N17 | SUITABLE FOR 17 AND OVER |
| NMA | MATURE AUDIENCES ONLY |

FIG. 23

A NEW MESSAGE HAS BEEN POSTED TO:
TV GUIDE X-FILES NEWSGROUP FORUM

FORM: X MAN
DATE: 4/21/00
IN REPLY TO: A CONSPIRACY

I AGREE, THERE IS A CONSPIRACY.

-- X MAN

FIG. 28E

MEDIA SYSTEM WITH INTERNET CONTENT

CROSS REFERENCE TO RELATED APPLICATIONS

This application is a continuation of U.S. patent application Ser. No. 12/559,955, filed Sep. 15, 2009, which is a continuation of U.S. patent application Ser. No. 09/605,683, filed Jun. 26, 2000 (now abandoned), which claims the benefit of U.S. Provisional Application No. 60/141,501, filed Jun. 28, 1999 and U.S. Provisional Application No. 60/144,695, filed Jul. 20, 1999. All these prior applications are hereby incorporated by reference in their entireties.

BACKGROUND OF THE INVENTION

This invention relates to television newsgroup systems, and more particularly, to techniques for providing and supporting newsgroup message forums in a television environment that may include an interactive television program guide.

A popular aspect of the Internet relates to Usenet message forums. A user of such a service may join a Usenet group to discuss a variety of topics. A Usenet server acts as an intermediary between the participants of a Usenet forum. Users post messages to a particular Usenet forum by typing in the message from their computer and transmitting the message to a Usenet server which makes the message available to the public. To read a Usenet message, a user logs onto the Usenet server, accesses the particular forum in which the message resides, and then opens the message. The user may then respond by posting another message to the Usenet server.

Usenet forums are referenced using associative parameters. For example, to read or post messages in the Seinfeld Usenet forum, a user might access the Usenet forum alt.tv.seinfeld. For a more general discussion of television sitcoms, the user might access the Usenet forum alt.tv.sitcom.

One of the problems with accessing a desired Usenet forum is that the name of a particular forum may not be easy to guess. Users may therefore search for desired forums. For example, a user who wishes to post a question about a particular opera he or she has recently seen might search for an appropriate Usenet forum using the keyword "opera." One search result may be rec.music.opera. Users may also search for desired forums by browsing through directories of forums.

Every time the user wishes to post or read about a message about a different topic, a search may be required. Moreover, Usenet forums are added and deleted on a regular basis. A user might use one Usenet forum to discuss a particular topic on one day, only to find on the next day that a new and narrower Usenet forum has been created that better suits the discussion.

Traditionally, Usenet forums have been used by the more savvy computer user. UNIX used to be a popular platform on which to run software such as "tin," which is a popular Usenet forum reader, allowing the user to search for Usenet forums, access Usenet forums, and read and post messages in the Usenet forums. With the Internet and computer technology becoming more mainstream, non-technical users are becoming increasingly active in the Usenet forum discussions. Services such as Dejanews provide a relatively user-friendly, web-based platform for accessing, posting, and reading the messages in most of the tens of thousands of Usenet forums currently available.

One of the benefits Usenet forums provide is the ability to post and retrieve files. Although the entire system of messaging is text-based, various methods of encoding digital data into text exist. Likewise, various methods of decoding text into digital data exist. UUencode and UUdecode are examples of such utilities, respectively.

Originally, Usenet forums were used for technical and academic discussions. Today's Usenet forums address a cross-section of everyday issues, including lifestyle, fashion, news, business, etc. Television programs are often discussed in Usenet forums as well. However, there is generally no way in which a user of a traditional Usenet forum service may easily view a television program while participating in a Usenet discussion about that program. A user might locate a television in the same room as the user's personal computer, but such an arrangement would be awkward to view. Moreover, many households locate their televisions in the living room, but are reluctant to locate their computers in the living room.

Although personal computers may be provided with tuner cards that allow television signals to be displayed on the computer monitor, many television viewers would prefer to view television on a traditional television. Televisions generally offer greater viewing areas than computer monitors, so that users need not sit nearly as close to a television screen as they would to a computer monitor. Televisions are also typically located in rooms within the home that are more suitable for watching television than where computers are typically located.

A system that attempts to integrate aspects of the Internet with the television viewing experience is available from WebTV Networks, Inc. of Palo Alto, Calif. The WebTV system permits television viewers to access the Internet through a WebTV Plus Receiver connected to their television sets. The WebTV Plus Receiver enables users to surf the World Wide Web on their television by connecting their televisions to the web-based WebTV Network through a standard phone line. The WebTV System permits users to view television program listings and web sites related to television programs that appear in the program listings.

The WebTV system also provides TV Crossover Links that allow users to access web sites that are related to television programs. The WebTV Plus Receiver detects data such as web links (i.e., URLs) that is embedded in the video broadcast and notifies users with a TV Crossover Link watermark on their television screens. The TV Crossover Links permit users to link to web sites through the Internet related to the television program that the user is watching. The user can view the web site and the television program simultaneously through the WebPIP picture-in-picture function. If the web site supports Usenet features, the user might access a given Usenet forum through the Internet while watching a television program. There is nothing in the WebTV system, however, that ensures that participants in the Usenet forum are watching the same television programs as the user. The messages in the forum may therefore be considerably less focused than they would be if all the participants were actively viewing the same television program.

Interactive television program guides implemented on set-top boxes allow users to view television program listings on their televisions. Such program guides allow users to view television program listings in different display formats and to perform various other functions. For example, a user may instruct the program guide to display a channel-ordered grid of current program listings. The user may also use the program guide to search for programs in a desired programming category such as sports, movies, news, or the like. If desired, the program guide may be used to order pay-per-view programming. Interactive program guides have not, however, been capable of providing Usenet-related features.

Previously-known systems have generally not provided television viewers with opportunities to engage in Usenet forum communications with other television viewers without relying solely on the Internet. Previously-known systems also have not provided television viewers with opportunities to engage in Usenet forum communications involving exclusively other viewers of a television program or channel. Moreover, previously-known interactive television program guides have not supported Usenet forum discussion features.

It is therefore an object of the present invention to provide a way in which an interactive television application such as an interactive television program guide may be used to assist users in accessing and interacting with newsgroups.

SUMMARY OF THE INVENTION

This and other objects of the invention are accomplished in accordance with the principles of the present invention by providing a television newsgroup system that allows users to use an interactive television application such as an interactive television program guide to access newsgroups.

Newsgroup features may be provided as part of an interactive television application such as an interactive television program guide. The users may watch television while accessing newsgroups related to the programming being viewed. Archived video clips may be accessed in this way.

The newsgroup feature may be accessed by the user while watching television or the newsgroup feature may also be accessed when the user is using an interactive television program guide and selects a program or class of programs. For example, while watching a television program, the user may press a "News" key on a keyboard or remote or may make an on-screen selection to invoke the newsgroup feature. A user of the interactive television program guide may activate the newsgroup feature while displaying an interactive information screen. The user may also activate the newsgroup feature by selecting a program, a channel, a category programming (e.g., movies), or other programming-related item (actor, director, etc.).

The interactive television application may allow the user to navigate directly to a newsgroup option that is not directly related to a selected program. The application may allow the user to continue watching television while accessing news groups.

The interactive television system may provide a set of newsgroups that may be made available to the user through the newsgroup feature of the interactive television application. The set of newsgroups may be limited to newsgroups that are specifically television related or may include a wider group of topics. The set of newsgroups may be cross-referenced with the programs, channels, and other topics covered by the interactive television program guide or other interactive television application. For example, while accessing newsgroup messages in a newsgroup related to "The Dukes of Hazard," a user may be provided with the ability to view other content related to The Dukes of Hazard. Links to television programming related to The Dukes of Hazard may be provided. Links to other newsgroups related to The Dukes of Hazard may be provided. A newsgroup may be cross-referenced to multiple topics. Cross-referencing may be performed manually or automatically. Cross-referencing may be performed once when a newsgroup is added into the system, or the cross-references may be updated continually based on the content of the newsgroup messages in the newsgroup. This cross-referencing allows the user to easily find all newsgroups that may be related to a specific topic of interest.

Newsgroups may be rated with parental control ratings. These ratings may be added manually or automatically. Some of the newsgroups may be moderated to ensure that they meet the specified rating. There may also be an automatic filter to ensure that content of some or all newsgroups meets standards.

The interactive application may have a parental control feature for newsgroups. The parental control feature for the newsgroups may be combined with the other parental control features of the interactive television application, or the parental control feature for newsgroups may be a separate feature. For example, if newsgroups are given ratings comparable to movies or television shows, then interactive television applications such as the interactive television program guide may block access to newsgroups with the same ratings as movies or programs that are blocked. Accessed to parentally-controlled newsgroups may be allowed, for example, to a user who knows a parental control code.

A parent may also specify that the application should block a specific newsgroup or list of newsgroups. In addition, the parent may specify a list of keywords to block. All newsgroups with those keywords may be blocked as well.

When accessed from a specific program, channel, category, actor, or other specific criteria, the interactive television application may automatically search for newsgroups that reference the specified criteria. As a television program may have several criteria, the newsgroups for each criterion may be combined into a single list. The interactive television application (e.g., the interactive television program guide) may present a list of newsgroups to the user and may allow the user to choose one or more newsgroups to access.

When accessed without specific program-related criteria, the interactive television application may allow the user to enter criteria, keywords, or other means to search for groups.

The application may allow the user to put newsgroups onto a list of favorite newsgroups. A household may have multiple lists of favorite newsgroups.

A user can ask to be notified (e.g., by e-mail) when a new newsgroup message is posted to a specific newsgroup. The notification may result from any new newsgroup message, from a new newsgroup message from a particular other user, from a new newsgroup message with a given subject, or from a new newsgroup message with specific keyword(s). The e-mail notification may be the new newsgroup message itself, or the e-mail message may include a link to the new newsgroup message (e.g., it may allow the user to launch the news reading application and go directly to the referenced newsgroup and newsgroup message).

The user may watch television at the same time as accessing newsgroups. For example, the television picture may be reduced to a partial screen, and the newsgroup functions may be provided in the remainder of the screen. If any newsgroup or newsgroup message references a particular television program or channel, the user may be able to immediately tune to it. In addition, if the interactive application (e.g., the interactive television program guide) supports such features, the user may be able set a reminder, purchase, lock out, add to a profile, schedule a recording, or otherwise act on a referenced program, channel, or other programming item.

The display screens presented may also include other items, such as advertisements. The advertisements may be related to newsgroups or the advertisement may not necessarily be related to newsgroups. The advertisement may be interactive.

When the user first enters the news reading function, a list of newsgroups may be displayed. These may be newsgroups related to selected criteria, a list of favorite newsgroups, etc. The list may include information on each newsgroup, such as the number of newsgroup messages, the number of unread newsgroup messages, etc. The user may select any newsgroup to access its newsgroup messages.

Within the newsgroup, the user may be presented with a list of newsgroup messages. The application may filter and sort the newsgroup message in multiple ways, based on user input. For example, the application may filter out previously read newsgroup messages, newsgroup messages in a particular thread, or newsgroup messages from a particular other user. The newsgroup messages may be sorted using message thread, date, sender, or other criteria.

The user may select any newsgroup message and read it. The user may also take other actions on the newsgroup message, such as deleting it (i.e., removing it from the user's view, although it may still remain in the newsgroup). The user may remove and/or block future newsgroup messages in this message thread or from the same sender. The user may ask to be notified when a new newsgroup message is received in this thread or from this sender.

A newsgroup message may include text, graphics, audio, video, or any combination of these or other content. Video may replace the television image or may be in a different portion of the screen. Audio may temporarily replace the television audio, or may be mixed with it. Newsgroup messages may also include interactive applications. For example, a Java applet may be attached to a newsgroup message if the interactive television environment supports downloaded Java applets. Other formats, such as DHTML and JavaScript may also be supported.

The user may reply to a newsgroup message in a newsgroup, or the user may post a new newsgroup message. A newsgroup message posted by the user may include text (e.g., entered with a wireless keyboard or on-screen keyboard). A newsgroup message may also include audio/video clips (e.g., previously recorded by the user on a local or remote digital server, or available from a library of video clips provided by the interactive application). A newsgroup message may also allow the user to import media, such as graphics, video, audio, etc., if the platform has such a capability (e.g., an IEEE 1394 port for retrieving data from a camcorder or digital camera).

The user may attach a reference to a particular program, channel, or other programming entity to a newsgroup message. A recipient of that newsgroup message may be able to easily access a description of that item, and act on it (e.g., set a reminder, purchase, lock, tune, record, etc.). A recipient of that newsgroup message via the Internet access (i.e., not using the interactive television application), may just see a text description of the item.

A user may request that an existing news group (e.g., one that is accessible via the Internet) be made available to the interactive television application. A user may also be able to create a new newsgroup that is accessible to the public. This new newsgroup may actually be hosted on a server related to the interactive television application, located for example at the television distribution facility (e.g., cable headend).

Further features of the invention, its nature, and various advantages will be more apparent from the accompanying drawings and the following detailed description of the preferred embodiments.

BRIEF DESCRIPTION OF THE DRAWINGS

FIG. 6B shows an alternative illustrative interactive television application display screen to the one shown in FIG. 6A in accordance with the present invention.

FIG. 8 shows an alternative illustrative newsgroup message listing display screen to the one shown in FIG. 7 in accordance with the present invention.

FIG. 23 is a chart of illustrative newsgroup ratings that may be used in accordance with the present invention.

FIG. 28E shows an alternative illustrative interactive television application display screen displaying the content of the e-mail message listing shown in FIG. 28C in accordance with the present invention.

DETAILED DESCRIPTION OF THE PREFERRED EMBODIMENTS

Newsgroups, for the purposes of the present invention, may include any message forum system, or any combination of message forum systems. For example, Usenet is a type of message forum system. Usenet is made up of tens of thousands of Usenet groups that span a large cross-section of subject matter. The interactive television application described by the present invention may create a portal to not only the Usenet groups (which are accessed primarily over the Internet) but also to small scale forums, such as local forums that are kept on personal web servers made available to the public. In addition, proprietary newsgroups may be available via the interactive television application. All of these forums are collectively referred to, herein, as "newsgroups." A "newsgroup" is any one generic forum, which may be a Usenet group or a proprietary forum or any other suitable forum. Standards, such as RFC1036 standard, may be used for specifying the format and content of newsgroup messages. For example, newsgroup message may limit newsgroup messages to American standard code for information interchange (ASCII) characters. If desired, other character sets may be used. Standards may be used for the transmission of newsgroup messages and for communication with newsgroup servers. These standards may include various protocols such as Unix-to-Unix copy protocol (UUCP) and transmission control protocol/Internet protocol (TCP/IP) for the transmission of newsgroup message information, requests, etc. Any suitable combination of transfer and transmission protocols may be used with any suitable combination of newsgroup message content standards.

Figure 1A:
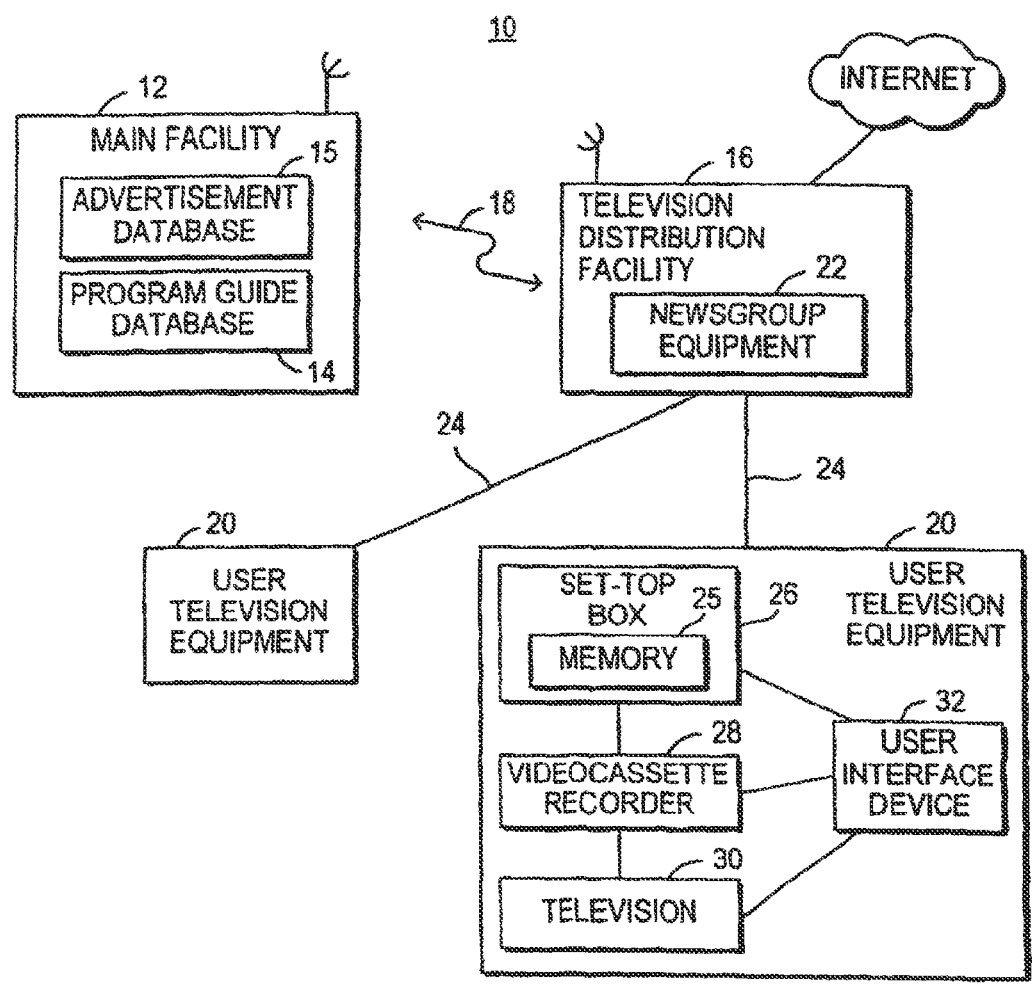
FIG. 1A is a diagram of an illustrative television newsgroup message system in accordance with the present invention.

An illustrative television newsgroup system 10 in accordance with the present invention is shown in FIG. 1A. Main facility 12 may contain a program guide database 14 for storing program guide information such as television program guide listings data, pay-per-view ordering information, etc. Database 14 allows system 10 to support an interactive television program guide if desired. Advertisement database 15 may be used to store advertisement banners, text, videos, etc. Although the television newsgroup features of the present invention may be provided using a television newsgroup system without a program guide, certain aspects of the invention will be described primarily in the context of an interactive television program guide system configuration for specificity and clarity. Interactive television program guides are interactive television applications that provide users with program listings and information on other content. Interactive television program guides may be implemented using client-server arrangements.

Information from database 14 may be transmitted to television distribution facility 16 via communications link 18. If desired, information from database 14 may be sent to any other suitable location (e.g., to a paging transmitter). That is, program guide data from database 14 need not be distributed by the same facility that distributes television programming. For example, television distribution facility 16 need not distribute program guide data, but rather may distribute television programming while a paging transmitter distributes the program guide data.

Link 18 may be a satellite link, a telephone network link, a fiber optic link, a cable link, a microwave link, a combination of such links, or any other suitable communications path.

Television distribution facility 16 is a facility for distributing television signals to users, such as a cable system headend. Some aspects of the invention may be implemented using a television distribution facility such as a broadcast distribution facility, or a satellite television distribution facility. Only one television distribution facility 16 is shown in FIG. 1A to avoid over-complicating the drawings. In general, however, main facility 12 distributes information to multiple television distribution facilities.

The program guide information transmitted by main facility 12 to television distribution facility 16 may include television program listings data such as program times, channels, titles, descriptions, etc. The information transmitted from main facility 12 may also include information on interactive message features (e.g., television program contests, surveys, evaluations, promotions, etc.) that are available for particular television programs or channels. The information transmitted from main facility 12 may also include newsgroup information. For example, cross-reference information between newsgroup content and other content provided by the interactive television application may be transmitted by main facility 12.

If desired, some of the program guide data and other TV message information may be provided using data sources at facilities other than main facility 12. For example, data relating to available television program-specific message features (e.g., a contest, promotion, survey, etc.) may be provided by a television program entity associated with a television channel, or other facility that is separate from main facility 12 and television distribution facility 16.

Television distribution facility 16 distributes program guide data and other information to the user television equipment 20 of multiple users via communications paths 24. Communication paths 24 are preferably bidirectional to support newsgroup messaging and preferably have sufficient bandwidth to allow television distribution facility 16 to distribute scheduled television programming, pay programming, newsgroup messages, and other video and audio information to user television equipment 20 in addition to non-video program guide information and newsgroup messages. The newsgroup messages supported by communication paths 24 may be text-based or, if more bandwidth is available, the newsgroup messages may be audio or video newsgroup messages, or larger text newsgroup messages (if, for example, digital data for multimedia files is encoded into text messages). If television distribution facility 16 is a cable system headend, communications paths 24 may be based on coaxial cable or fiber optics or the like. If television distribution facility 16 is a satellite system or broadcast system, unidirectional paths may involve transmitting information in free space. Bidirectional paths may have a free-space downlink to the home and a telephone line or cable or fiber optic return path from the home to the television distribution facility 16.

User television equipment may be based, for example, on a set-top box or other such device. For clarity, many aspects of the invention are described in connection with this illustrative arrangement, although any other suitable hardware arrangement for the user television equipment 20 may be used if desired.

Multiple television and audio channels (analog, digital, or both analog and digital) may be provided to user television equipment devices 20 (including, e.g., set-top boxes 26) via communications paths 24. If each path 24 includes a number of traditional analog television channels, one or more of these channels may be used to support a number of digital channels. The bandwidth of each analog channel that is used to support digital channels may support ten or more of such digital channels. Two-way digital channels typically require more bandwidth than one-way digital channels. Such two-way digital channels may support two-way communications in the form of newsgroup messages between set-top boxes 26 and a server (e.g., at television distribution facility 16). If two-way communications between set-top boxes 26 and television distribution facility 16 involve only text or audio signals, the bandwidth required to support such two-way communications may be substantially less than the bandwidth required to support two-way communications involving video and may even be substantially less than a one-way digital channel carrying video.

Newsgroup messages may be distributed along communications path 24 using any number of suitable techniques. For example, text newsgroup messages may be distributed using out-of-band channels on paths 24 using out-of-band modulators. Video or audio newsgroup messages (encoded or not encoded) may be more efficiently transmitted using one or more digital channels on path 24. Such digital channels may also be used for distributing text and graphics. Any suitable communications protocols may be used for sending newsgroup messages and the like. For example, communications may be analog or digital, synchronous or asynchronous, packet-based, Internet protocol transmissions, etc.

Dedicated digital or analog channels, or at least an allocated portion of the available bandwidth in communications paths 24, may be used for the transmission of newsgroup messages. Such dedicated channels may be separate from the channels used for transmitting television program broadcast signals to the user television equipment.

Television programming may be transmitted to user television equipment 20 along one communications path such as a satellite link from a satellite system, while newsgroup messages to and from the user are distributed over a second communications path such as a telephone or cable.

Television distribution facility 16 preferably has a server or other suitable computing equipment or audio or video equipment such as audio voice mail equipment (herein collectively referred to as newsgroup equipment 22) for supporting the transmission of newsgroup messages between users and newsgroup server (local or remote). For clarity, certain aspects of the invention are simply described as being implemented using a newsgroup server although these aspects of the invention are also applicable to other types of newsgroup equipment. The newsgroup equipment 22 (e.g., a newsgroup server) may be capable of handling newsgroup messages involving text, graphics, video, or audio data. If desired, the bandwidth requirements of newsgroup message equipment 22 may be reduced by restricting newsgroup messages to text, audio, and/or graphics, rather than including video. Newsgroup equipment 22 in television distribution facility 16 may be configured in a client-server arrangement in which each piece of user television equipment 20 (i.e., each user television equipment device 20) acts as a client processor.

Each user may have a receiver, which is typically a set-top box such as set-top box 26, but which may also be other suitable television equipment into which circuitry similar to set-top box circuitry has been integrated. For example, user television equipment 20 may be based on an advanced television receiver such as a high-definition television (HDTV) receiver or other such television-based platform. A set-top box may include a DOCSIS modem for use in two-way communication to and from a server or television distribution facility. For clarity, the present invention will be described primarily in the context of user television equipment 20 that is based on set-top boxes 26. As shown in FIG. 1A, each set-top box 26 may have memory 25. Memory 25 may be used, for example, for maintaining a database of program listings data.

Program guide information may be distributed to set-top boxes 26 continuously (in real-time), periodically, on request (using a client-server arrangement), or using a combination of these techniques. Newsgroup messages may be distributed to set-top boxes 26 in real-time or on-demand (e.g., when a user checks newsgroup forums or newsgroup equipment 22 and requests a newsgroup message for viewing). If desired, newsgroup messages may be transmitted to the user periodically. For example, newsgroup messages in the user's favorite newsgroups may be periodically transmitted to the user's set-top box 26 and stored (or generate an e-mail message, etc.).

The newsgroup equipment 22 may receive newsgroup messages from set-top boxes 26 in real-time or periodically. If desired, newsgroup equipment 22 may receive newsgroup messages on-demand. For example, after a user writes a newsgroup message and is stored in the set-top box 26, a routine that informs newsgroup equipment 22 that new newsgroup messages are waiting may be activated causing newsgroup equipment 22 to collect the newsgroup message stored in set-top box 26. Alternatively, newsgroup equipment 22 may periodically (or randomly or continuously) poll the user television equipment 20 to determine if there are any new newsgroup messages that the user wishes to post to one or more particular newsgroups. Such polling may be merely consist of a flag dedicated to informing newsgroup equipment 22 whether new newsgroup messages are waiting to be posted. If such newsgroup messages exist, then newsgroup equipment 22 may collect the newsgroup messages and post them accordingly. These are illustrative methods for collecting newsgroup messages from user television equipment 20 by newsgroup equipment 22. Any other suitable method may be used.

Main facility 12 preferably contains a processor to handle information distribution tasks. Each set-top box 26 preferably contains a processor to handle tasks associated with implementing an interactive television program guide application containing television newsgroup features or an independent television messaging application on the set-top box 26 (hereinafter collectively referred to as a television newsgroup messaging set-top box application or simply a set-top box application). Television distribution facility 16 preferably contains one or more processors (e.g., part of newsgroup equipment 22) for tasks associated with the distribution of newsgroup messages and for tasks associated with providing program guide data to the program guide on the set-top boxes.

It should be understood that some or all of the functions of the program guide or the newsgroup messaging set-top box application hereinafter described may be integrated into an operating system on the set-top box, implemented as a stand-alone application on the set-top box, or performed by a server (e.g., part of newsgroup equipment 22 or separate from the television distribution facility). In a client-server architecture, the set-top box sends data or requests to the server. The server can store and process data and send the results of a request back to the user television equipment for further processing, display, or storage. Any of the functionality of the set-top box application hereinafter described may be implemented using client-server architecture.

Various mechanisms may be used for launching the television newsgroup messaging set-top box application from a program guide application on the user's set-top box. One mechanism involves using a hot link to launch the television newsgroup messaging set-top box application. Hot linking involves invoking a non-program-guide application such as television newsgroup messaging set-top box application with information such as a web site address, e-mail address, program title, or other information that has been preselected based on the current content of the program guide or status of set-top box 26. For example, if the user is watching a program, viewing a program listing, viewing the description of a program, or taking other action within the program guide related to a given program, channel, type of channel, or the like and the user directs the program guide to launch a non-program-guide application, the program guide may launch that non-program-guide application and direct that non-program-guide to take an action related to the given program, channel, type of channel, or the like.

Hot links may be activated by dedicated buttons, a launch button, menu options, or any other suitable technique. For example, a remote control may be provided with a dedicated newsgroup button, a dedicated shopping button, and similar buttons associated with other non-program-guide applications. When the user presses the newsgroup button, the program guide launches the television newsgroup messaging set-top box application and directs the television newsgroup messaging set-top box application to set up a newsgroup message to a newsgroup forum devoted to a character in the program, a fan club, or entities associated with the program. When the user presses a shopping channel button, the program guide launches a shopping application (e.g., for purchasing gifts for recipient users) and directs the program guide to preselect merchandise related to the program. Further features of an illustrative hot linking system are described in commonly assigned U.S. patent application Ser. No. 09/346,134 (Michael D. Ellis, et al.), which is hereby incorporated by reference in its entirety.

Each set-top box 26 is typically connected to an optional videocassette recorder 28 or other such recording device so that selected television programs may be recorded. Each videocassette recorder 28 (or set-top box 26) may be connected to a television 30. To record a program, set-top box 26 tunes to a particular channel and sends control signals to videocassette recorder 28 (e.g., using an infrared transmitter) that direct videocassette recorder 28 to start and stop recording at the appropriate times. If desired, any other suitable recording device may be used (e.g., personal television recorder) that may use either analog or digital recording means and/or media. If desired, the recording device may be incorporated into set-top box 26, television 30, or any other suitable equipment.

During the use of the television newsgroup systems, the television newsgroup messaging set-top box application on set-top box 26 may display newsgroup messages on television 30. If the television newsgroup system includes an interactive television program guide, the interactive television program guide may display program listings on television 30. A program guide with newsgroup message features may also be used to display the newsgroup messages. Each set-top box 26, videocassette recorder 28, and television 30 may be controlled by one or more user interfaces 32 which may involve a remote control, mouse, trackball, microphone, digital video camera, dedicated set of buttons, LCD keypad, personal digital assistant (PDA), etc.

Figure 1B:
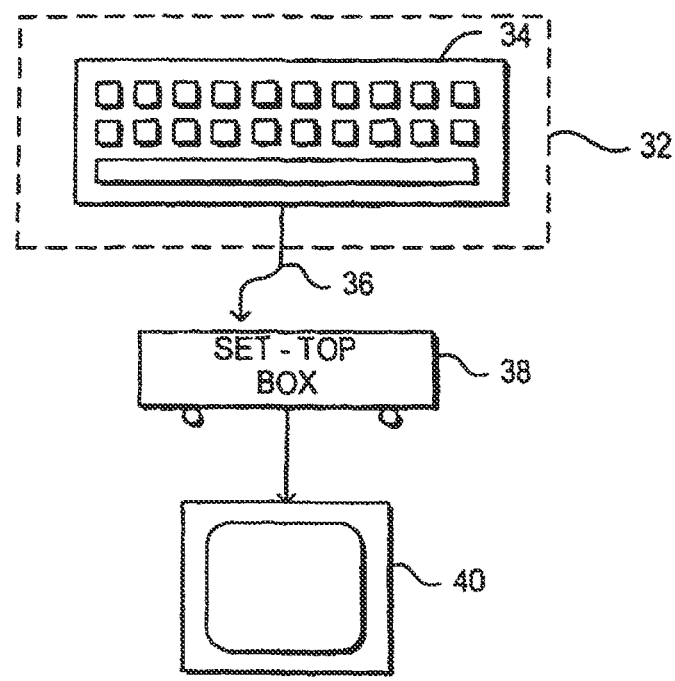
FIG. 1B is a diagram of an illustrative user television equipment device having a user interface based on a wireless keyboard in accordance with the present invention.

As shown in FIG. 1B, user interface 32 may contain a wireless keyboard 34 that sends signals 36 (e.g., infrared signals) to set-top box 38, which is connected to television 40. The user's input may be displayed as part of a television newsgroup system display screen on television 40 as the input is entered through wireless keyboard 34. If television newsgroup system 10 is based on an interactive television program guide, the display screen provided on television 40 by set-top box 38 may be on an interactive television program guide display screen. The displayed interactive television program guide display screen or other program guide display screens provided by the program guides may contain program listings.

Figure 1C:
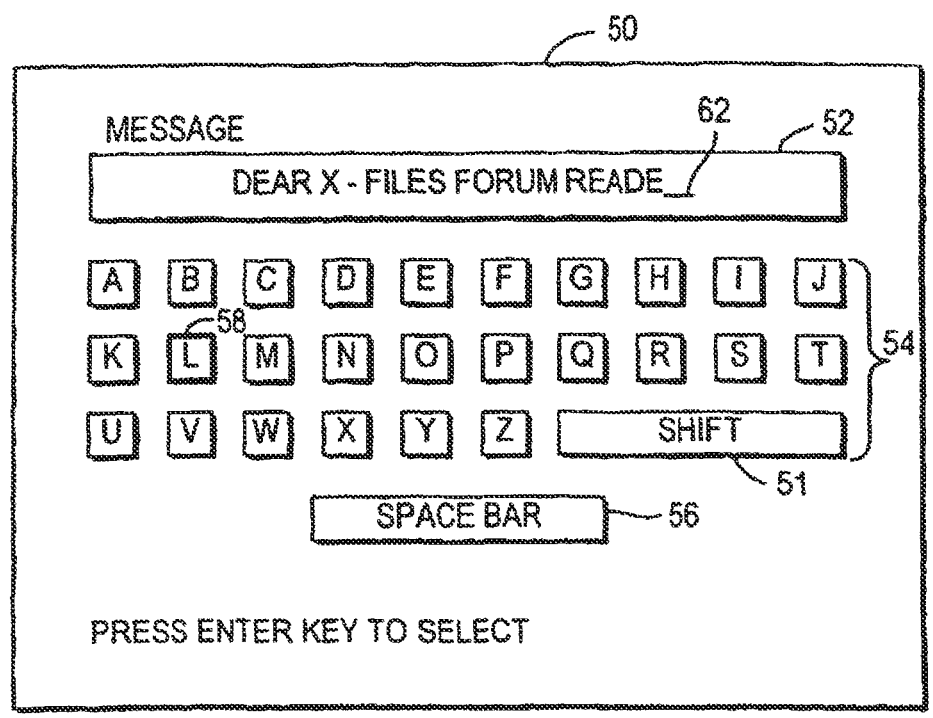
FIG. 1C is a diagram of an illustrative television screen keyboard user interface in accordance with the present invention.

User interface 32 may also be based on a television screen keyboard 50 as illustrated in FIG. 1C. The user can select letters from the displayed alphabet to compose a message 52. In particular, the user may select letters from alphabet keys 54 and spaces from space bar 56. The user may select a letter so that it becomes highlighted (such as letter L 58) by pressing arrow keys and an enter key (also called an OK or select key) on a remote control. Pressing the OK key on the remote control directs the program guide containing message features or the independent messaging application to place the selected letter adjacent to cursor 62. The user may select SHIFT option 51 to place a capital letter in message 52. In this way, a user can compose the text of a message.

Figure 1D:
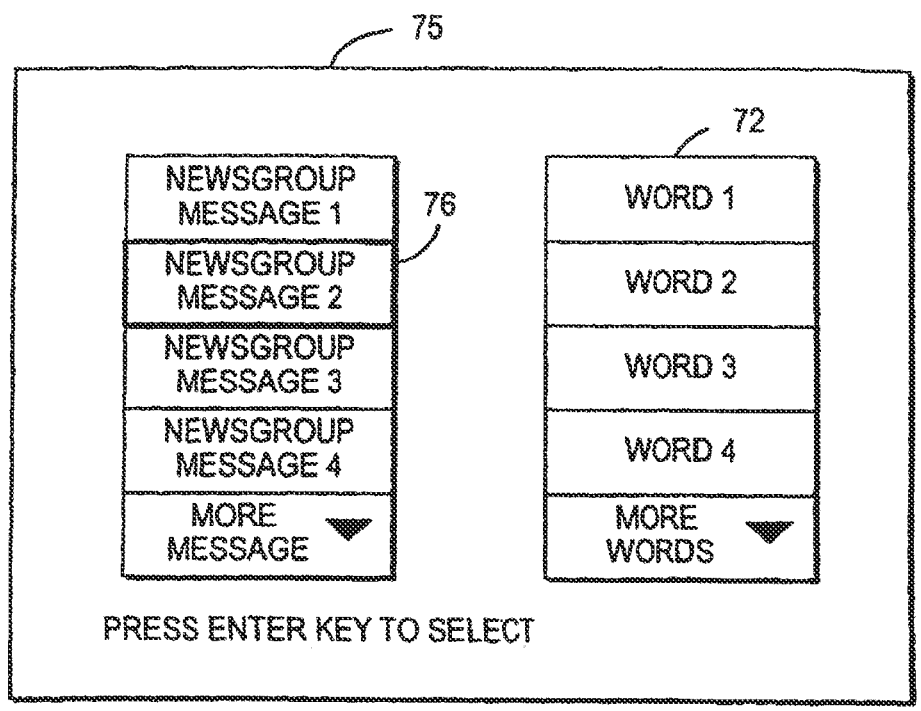
FIG. 1D is a diagram of an illustrative user interface television display screen providing a list of standard messages or words in accordance with the present invention.

If desired, the user may compose newsgroup messages by selecting from a list of standard newsgroup messages 70 or words 72 displayed in a display screen such as display screen 75, as shown in FIG. 1D. The words or newsgroup messages may be predetermined, determined by the user, or both. If determined by the user, they may be specifically entered by the user into the list, or they may be automatically saved by the system based on newsgroup messages previously sent by the user. A word or newsgroup message can be selected by pressing arrow keys on a remote control to place highlight region 76 on top of a particular word or newsgroup message such as "newsgroup message 2" in FIG. 1D. The user can then select the highlighted word or newsgroup message by pressing a remote control enter (or select or OK) key.

System 10 allows users at user television equipment 20 to exchange television program-related newsgroup messages while watching television. The user may send newsgroup messages with system 10 without investing the effort involved in operating a personal computer and the software that is associated with it. In addition, system 10 allows users to retain the high video quality and channel range of television viewing while exchanging newsgroup messages.

Figure 2A:
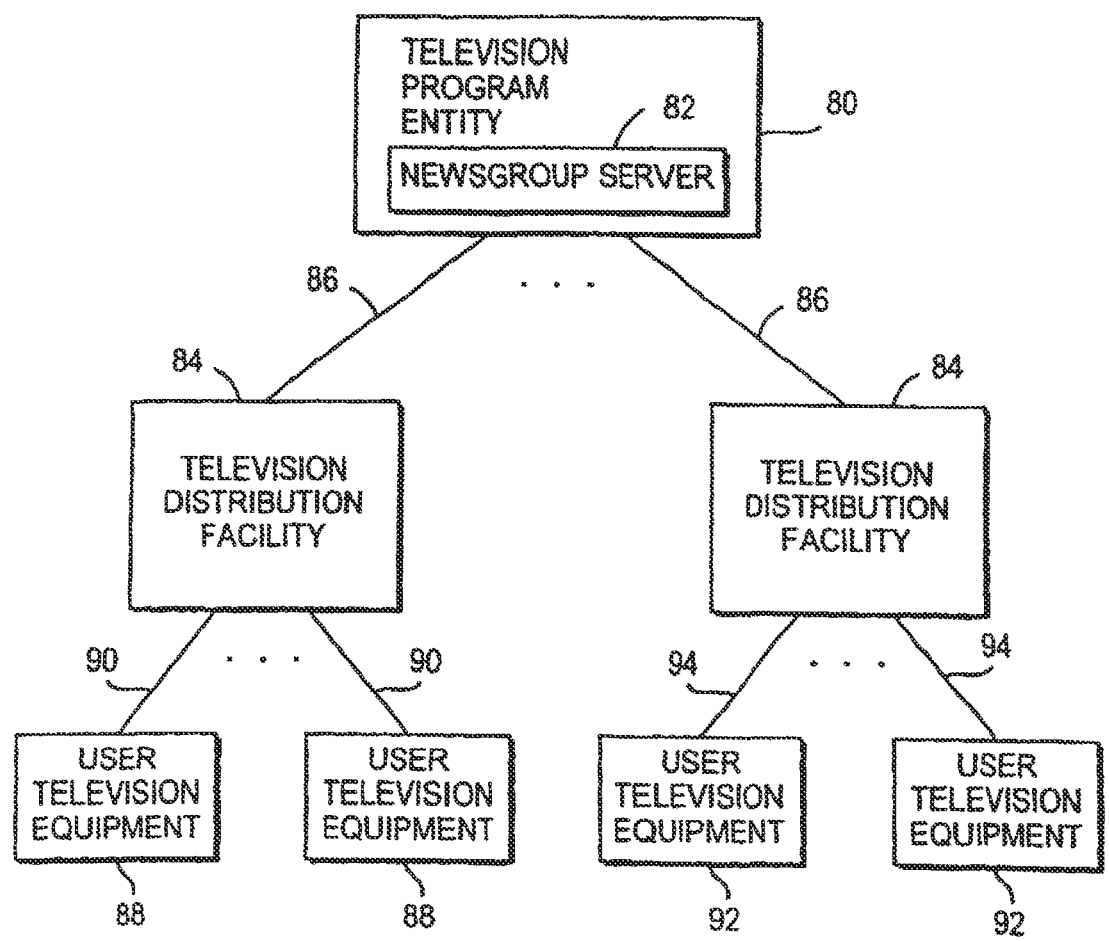
FIG. 2A is a diagram of an illustrative system in which user television equipment devices of multiple television distribution facilities are connected via a television program entity in accordance with the present invention.

As shown in FIG. 2A, a television program entity 80 may contain a message server 82 to store messages sent between user television equipment 88, 92, and any other such user television equipment. The television program entity may be a message facility associated with a television channel that receives and processes messages sent by users of user television equipment devices to a television program or channel. User television equipment devices 88 and 92 are connected via communications paths 90 and 94 respectively to television distribution facilities 84 that are in turn connected to television program entity 80 via communication links 86. Communications links 86 may be satellite links, telephone network links, fiber optic links, cable links, microwave links, combinations of such links, or any other suitable communications path.

Figure 2B:
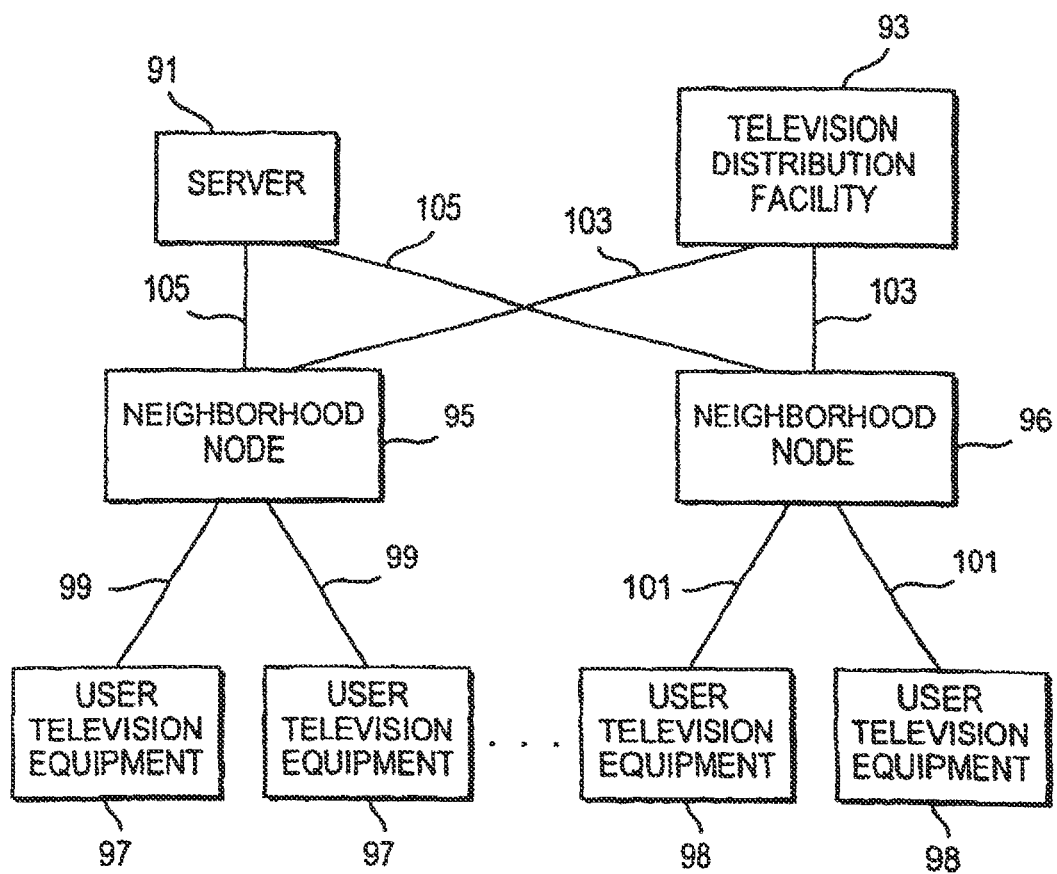
FIG. 2B is diagram of an illustrative system showing how multiple user television equipment devices may be connected to a television distribution facility and a separate server via neighborhood networks in accordance with the present invention.

Newsgroup messages may be handled on a server that is not located at the television distribution facility as shown in FIG. 2B. For example, newsgroup messages may be stored on server 91 and transmitted between user television equipment devices 97 and 98 via neighborhood nodes 95 and 96. User television equipment device 97 are connected to neighborhood node 95 via communications path 99, and user television equipment devices 98 are connected to neighborhood node 96 via communications path 101. Neighborhood nodes 95 and 96 decrease the bandwidth requirements on communications paths 99 and 101 for a given number of user television equipment devices 97 and 98. Neighborhood nodes 95 and 96 may route television programming from television distribution facility 93 to user television equipment 97 and 98. Neighborhood nodes 95 and 96 may also route newsgroup messages between server 91 and user television equipment 97 and 98. Neighborhood nodes 95 and 96 may also route requests to perform many of the newsgroup message system functions described herein from user television equipment 97 and 98 to server 91. Responses from server 91 are routed back to the appropriate user television equipment device via a neighborhood node.

Figure 3:
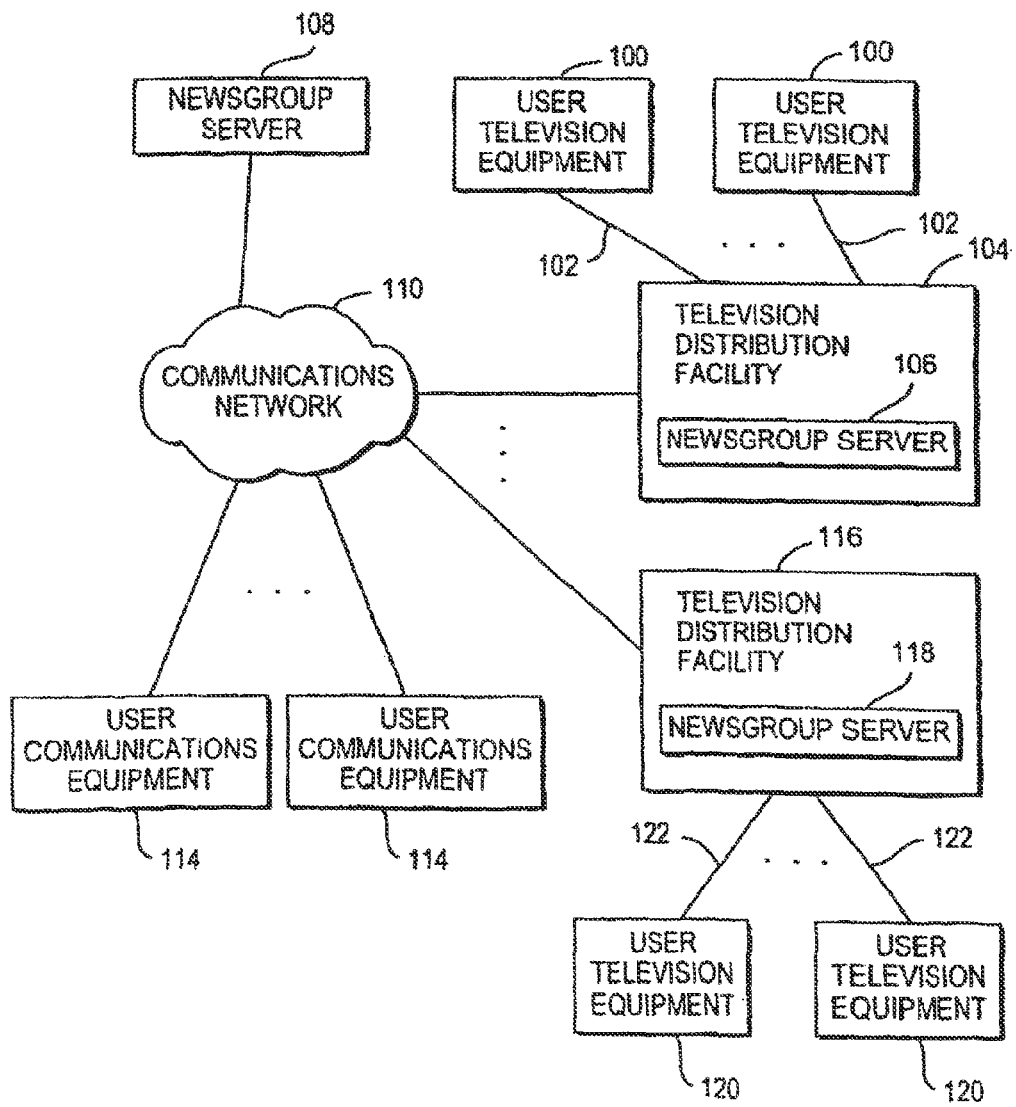
FIG. 3 is a diagram of an illustrative system showing how multiple television distribution facilities and user communications equipment devices may be connected via a communications network in accordance with the present invention.

As shown in FIG. 3, newsgroup messages can be distributed along communication paths 102 from one user television equipment device 100 associated with television distribution facility 104 to another user television equipment device 100 associated with that facility using a newsgroup server 106 located at the facility. The newsgroup messages sent between two or more user television equipment devices 100 associated with television distribution facility 104 may be stored on newsgroup server 106 in television distribution facility 104. An advantage to limiting operation of the newsgroup message system to individual television distribution facilities is that it allows individual cable system operators (for example) to control their systems, and it does not involve coordinating the transmission of newsgroup messages related to an on-going television program between different geographical areas or different time zones. If desired, newsgroup messages exchanged by user television equipment 100 can be stored by a newsgroup server 108 that is connected to television distribution facility 104 via communications network 110. Communications network 110 may be any suitable communications network such as the Internet, a public or private telephone network, a network involving satellite link or wireless links, a cable network, etc.

The newsgroup message system may also be configured so that users at one or more of user television equipment devices 120 may exchange messages with one or more of user television equipment devices 100. User television equipment 120 is associated with a different television distribution facility than user television equipment 100. User television equipment devices 120 are connected to television distribution facility 116 via communications paths 122. Newsgroup server 118 may be used to store newsgroup messages. The configuration of newsgroup server 118 and user television equipment 120 may be based on a client-server arrangement. Television distribution facilities 104 and 116 may be connected to each other via communications network 110. Newsgroup messages that are sent between user television equipment 100 and user television equipment 120 may be stored on newsgroup servers 106, 108, or 118. If desired, any number of television distribution facilities may be connected together via communications network 110 or other such communications networks to allow user television equipment from these television distribution facilities to exchange newsgroup messages with each other.

In addition, newsgroup messages may be transmitted between user television equipment 100 or 120 and user communications equipment 114. User communications equipment 114 is connected via communications network 110 to television distribution facilities 104 and 116. User communications equipment devices 114 can be any number of, e.g., personal computers that can send and receive newsgroup messages.

Figure 4:
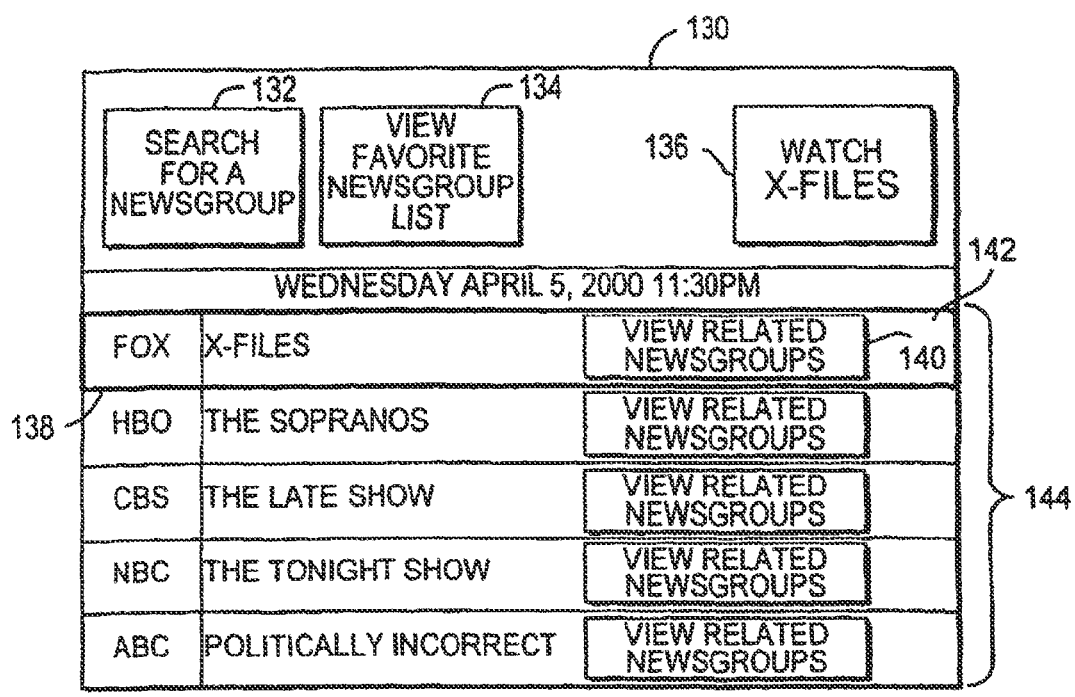
FIG. 4 shows an illustrative interactive television program guide display screen in accordance with the present invention.

FIG. 4 shows an illustrative program guide display screen 130. A program listings region 144 may be provided. Each program listing 142 that has at least one related newsgroup may alert the user that such a newsgroup exists. Icon 140 may be used to alert the user that at least one newsgroup related to "X-Files" is available. If desired, any other suitable method of notifying a user that a newsgroup exist may be used. This includes the use of pop-up windows, pop-up icons, audio signal, etc. Program listings 144 may be selectable. Highlight region 138 may be used to select individual program listings by using, for example, cursor buttons on a remote control. If desired, any other suitable device or method may be used to select selectable elements on a television display screen. For example, a remote control with a trackball and selection keys, a wireless keyboard, a wireless mouse, virtual reality gloves, etc. may be used to move a selection region such as a cursor or highlight region 138 among selectable elements of the television display screen, and to select any selectable element on the television display screen.

FIG. 4 shows highlight region 138 on program listing 142. The user may select listing 142 by pressing an enter button or the user may perform any other suitable task to accomplish a selection of program listing 142. Upon selection, a display screen showing more information about the particular program listing selected may be displayed. This information screen is illustrated in FIG. 5.

Figure 5:
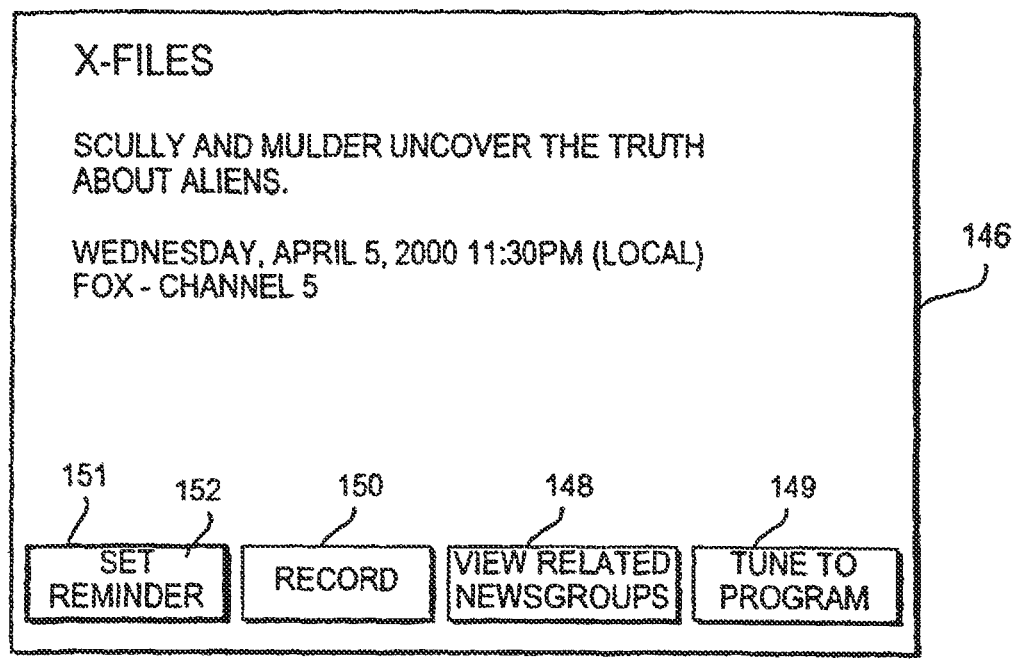
FIG. 5 shows an illustrative interactive television application display screen with information about a particular program in accordance with the present invention.

FIG. 5 shows information screen 146 that contains information on the selected program listing 142. In addition to providing additional information, information screen 146 may provide selectable elements such as icons 152, 150, 148 and 149. If the user selects icon 152, the user may be given the opportunity to set a reminder for this program, whereby an icon, a message, or any other suitable indication may appear at some predetermined time prior to the start of the television program. If the user selects icon 150, the user may be given the opportunity to schedule a recording of this program using, for example, videocassette recorder 28. If the user selects icon 148, the user may be shown a list of newsgroups that relate to the present program. If the user selects icon 149 and if the program associates with the selected program listing is being currently broadcast, the program may be tuned to. These icons are merely illustrative. Any other suitable icons or any other selectable elements may be used for any other suitable features in addition to those shown, or in place of those shown. Any suitable combination and arrangement of these selectable elements may be used.

The user may use cursor keys on the remote control to navigate a highlight region 151 among any of the selectable elements on the display screens presented by the interactive television application. For example, by pressing a right cursor key on the remote control while highlight region 151 is on reminder icon 152 may cause highlight region 151 to move over record icon 150. A subsequent pressing of the right cursor key of the remote control may cause highlight region to move over icon 148. Yet another subsequent pressing of the right cursor key may cause highlight region 151 to move over reminder icon 152. This subsequent pressing of the right cursor key may, on the other hand, cause nothing to happen, or it may cause another option to be displayed on the screen (that was previously not displayed) and to be highlighted. This is an illustrative method of using a remote control's cursor keys to select selectable elements on the display screen. Any other suitable method may be used. The cursor keys of the remote control may be used to perform any and all navigation functions as described herein. Likewise, selection keys on the remote control may be used for any and all selection functions as described herein.

Figure 6A:
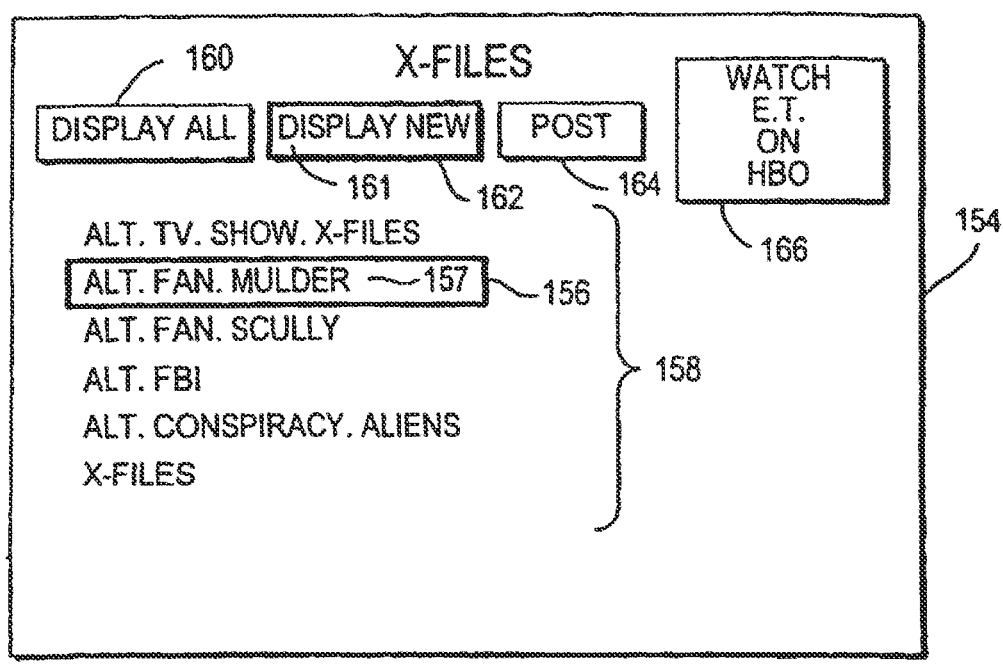
FIG. 6A shows an illustrative interactive television application display screen with newsgroup listings in accordance with the present invention.

If the user selects icon 148, a separate screen may be presented to the user as illustrated in FIG. 6A. FIG. 6A shows newsgroup listing display screen 154. Selection of icon 140 in FIG. 4 may also cause display screen 154 to be displayed. Newsgroup listings 158, related to the selected program (i.e., "X-Files"), may be displayed. If desired, only selected newsgroups may be displayed to the user. For example, if particular newsgroups have not been active for a particular period of time, those newsgroups need not be listed. A newsgroup may be said to be "active" when a newsgroup message is posted to it. If desired, a newsgroup may be said to be "active" when a pre-defined number of newsgroup messages, greater than one, are posted to it. Using highlight region 156 to navigate among each newsgroup listing, the user may select a particular newsgroup listing 157. If selected, the newsgroup messages contained in the selected newsgroup may be displayed.

Because a large number of newsgroup messages may be stored in a particular newsgroup, the user may be given the ability to display only the newest newsgroup messages. The newest newsgroup messages may be the newsgroup messages for that hour, for that day, etc. If desired, the newest newsgroup messages may be any unread newsgroup messages in the selected newsgroup. This is merely illustrative, any other suitable technique may be used to allow the user to reduce the number of newsgroup messages displayed. The user may select such an option by selecting an icon. The user may place a highlight region 162 on the display new icon 161, and press an enter key, or perform any other suitable task to make a selection. If the user wishes to view all of the newsgroup messages available for a particular newsgroup, the user may place highlight region 162 over icon 160 and select icon 160. Once the user selects one of icons 160, 162, or 164, the user may press an appropriate button on the remote control, such as a "mode" button or a down cursor key. This may allow the user to have control of highlight region 156 and allow the user to navigate highlight region 156 among newsgroup listings 158. For example, if the user wishes to view only the new newsgroup messages in alt.fan.mulder, he may first select display new icon 161 using highlight region 162, then issue an appropriate user command using the remote control and then use highlight region 156 to select newsgroup listing 157. If desired, the process may be reversed, whereby the newsgroup listing is selected first and one of icons 160, 162, 164 is selected second. Any other suitable method for selecting a newsgroup to view its corresponding newsgroup message listings (including subsets of newsgroup message listings) may be used.

If desired, advertisement 166 may be displayed. Advertisement 166 may be any random advertisement for a program, product, or service. If desired, advertisement 166 may be an advertisement for a program, product, or service related to the program for which listings 158 are being displayed. For example, as illustrated, since the newsgroup listings 158 relate to the X-Files, a science fiction show about alien conspiracies, advertisement 166 may relate to a program about aliens (e.g., E.T.). If desired, advertisement 166 may relate to newsgroups (e.g., to promote a particular newsgroup). If desired, advertisement 166 may be interactive. The user may be allowed to select advertisement 166 using any suitable means in accordance with the present invention. If advertisement 166 is selected, an information screen associated with the product, program, or service being advertised may be displayed to the user (e.g., similar to the one shown in FIG. 5). If desired, advertisement region 166 may change as a predetermined period of time passes. This is merely illustrative. Any other suitable features for advertisement 166 may be implemented.

Alternatively, the newsgroup list may include information on each group, such as the number of newsgroup messages, the number of unread newsgroup messages, etc. This is illustrated in FIG. 6B. A newsgroup column 163 may be provided that shows the name of the newsgroup. A number of messages column 165 may be provided that shows the number of newsgroup messages in the corresponding newsgroup. These may be the total number of newsgroup messages, the total number of new newsgroup messages, etc. An unread messages column 167 may be provided that shows the number of unread newsgroup messages (out of the number of messages) by the user. A type column may be provided that shows what type of newsgroup (e.g., Usenet, proprietary, etc.) the corresponding newsgroup is. Any other suitable information about the newsgroups may be displayed.

Figure 7:
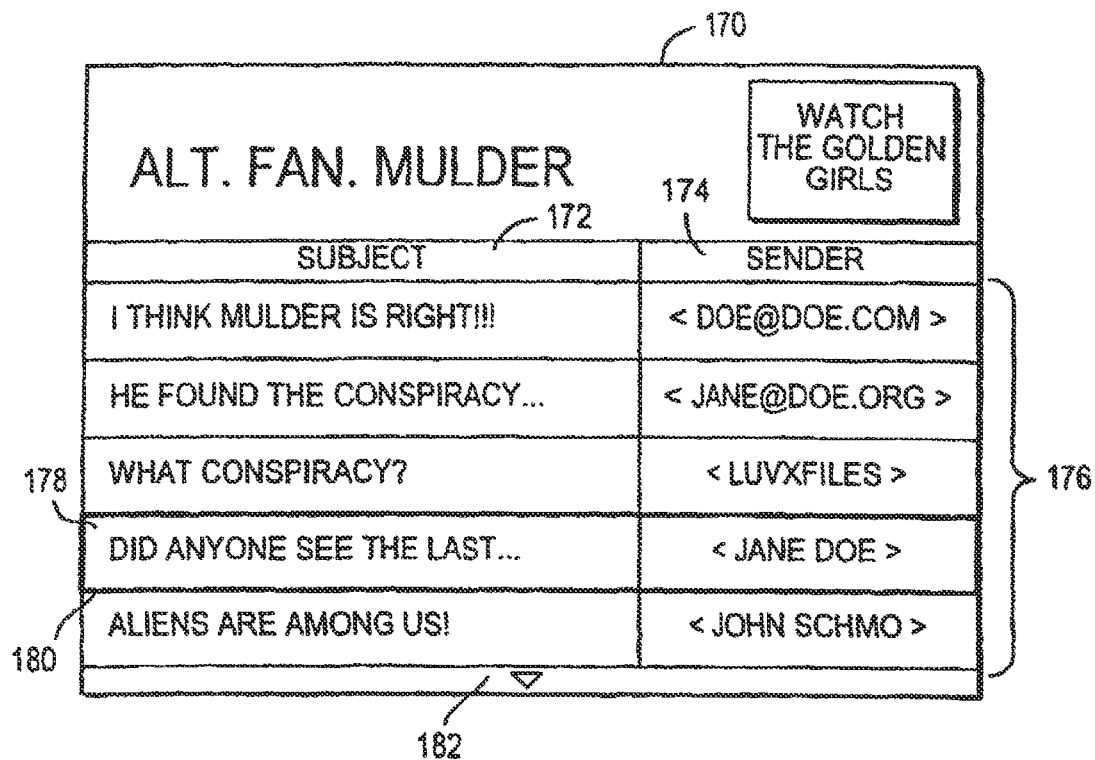
FIG. 7 shows an illustrative newsgroup message listing display screen in accordance with the present invention.

Once a newsgroup listing 157 is selected, a newsgroup message screen, listing the messages in the selected newsgroup, may be presented. FIG. 7 illustrates a newsgroup message screen 170. A newsgroup message listings 176 may be displayed that lists predetermined fields of information for each displayed newsgroup message listing. For example, a subject field 172 and a sender field 174 may be provided to display the subject and sender of each particular newsgroup message, respectively. If desired, any other suitable information fields may be provided. These information fields may be chosen by the user in a set-up operation of the set-top box, or through any other suitable means. If desired, the information fields may be controlled by the television distribution facility and not under the control of the user. If desired, field bars 172 and 174 may be selectable. Selection of one of the bars may change the order in which newsgroup message listings 176 are displayed. For example, if sender bar 174 is chosen, the newsgroup messages may be arranged in alphabetical order of the text appearing in the sender field of each newsgroup message. If a date field is provided, the date field may be selected to arrange the message in chronological order. If desired, if a field bar is selected once, the ordering may go one way (e.g., ascending dates of the field is a date field) and if the same field bar is selected again, without any intermittent selections of other field bars, the ordering may go in the opposite direction (e.g., descending dates if the first ordering was in ascending dates). Selection may be made using cursor buttons on the remote control to navigate highlight region 180 over field bars 172 and 174, and a select button may be pressed when highlight region 180 is over the desired field bar. Any other suitable use of information fields may be implemented. This includes displaying any other suitable information fields, such as time sent, e-mail address, etc.

The information displayed in newsgroup message listings 176 may be primarily composed of information provided in the headers of the associated newsgroup messages. These headers may include information such as sender name, sender e-mail address, date sent, time sent, routing information, identification information, etc. In the case of Usenet messages, standards such as the RFC1036 standard specify what information must be included in the headers of newsgroup messages posted to Usenet servers.

Newsgroup message listings may be filtered by the interactive television application. For example, previously read newsgroup messages may be filtered from the newsgroup message listings. Newsgroup messages in a particular thread may be filtered out. Newsgroup messages from another particular user may filtered out. Any suitable desired filtering specification may be used. The filtering may be performed based on user input. For example, the user may enter an options screen that may allow the user to filter based on several choices, including keywords, threads, senders, dates, etc. These preferences may then be saved for future reference by the interactive television application. This is merely an illustrative embodiment of the filtering feature. Any other suitable implementation or arrangement may be used.

If there are more newsgroup message listings 176 than can fit on the display screen 170 at one time, a scroll bar 182 may be displayed to indicate that more listings are available. The user may view the additional listing by selecting scroll bar 182. Alternatively, the user may view the additional listings by simply scrolling to the bottom of the currently displayed listing and then issue another scroll down command so that the top listings may disappear as the listings previously not seen appear at the bottom. This is merely illustrative. Any other suitable method for displaying newsgroup message listings that do not fit on a display screen may be used.

If desired, other suitable views of newsgroup message listings may be provided. For example, FIG. 8 illustrates another way in which newsgroup message listings may be displayed. Newsgroup message listings display screen 184 shows newsgroup message listings 186 arranged in a threaded format. That is, each message is shown relative to its position in a chain of replies. For example, newsgroup message 188 may be the beginning of a new chain of newsgroup messages (indicated by the fact that it is not indented). Newsgroup message 190 is a reply to newsgroup message 188 (indicated by the fact that it is indented one time). Similarly, newsgroup message 192 is a reply to newsgroup message 188. Newsgroup message 194 is a reply to newsgroup message 192 (indicated by the fact that it is indented twice). Newsgroup message 196, not being indented at all, is the beginning of a new series of newsgroup messages. This view of newsgroup message listings is merely illustrative. Any other suitable view may be used.

If desired, the views may be changed by the user. This may be accomplished through the activation of an options screen, where the user selects a new type of view. The views may change automatically, after selection of the new view. Or, if desired, the view may change the next time a newsgroup message listings display is viewed. Any suitable method of changing views may be used.

Each newsgroup message listing may be selectable. Highlight region 198 may be provided to the user to navigate among newsgroup message listings 186. When highlight region 198 is on a newsgroup message the user wishes to view, the user may select that listing. For example, if the user wishes to read the content of the newsgroup message represented by newsgroup message listing 200, the user may move highlight region 198 over newsgroup message listing 200 and select it. This may cause newsgroup message display screen 202 of FIG. 9 to be displayed.

Newsgroup message display screen 202 may display newsgroup message body 206, which is the newsgroup message that was posted by the sender. Header 204 may be displayed as well. Header 204 may contain sender information, the subject, date sent, and time sent. Header 204 is illustrative. Any other suitable information may be used in any desired combination.

Figure 9:
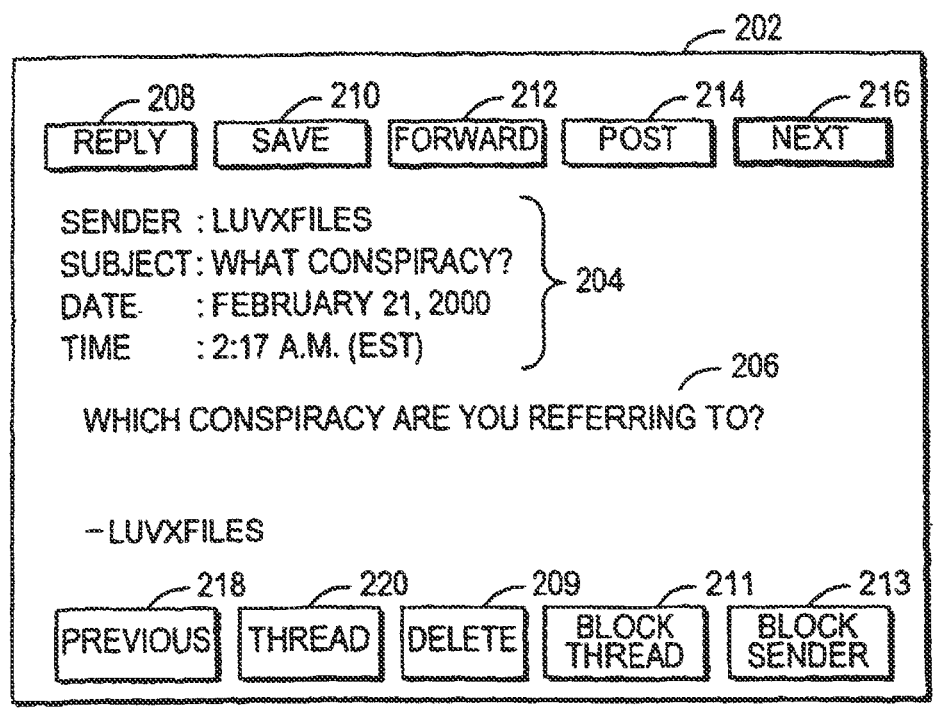
FIG. 9 shows an illustrative newsgroup message display screen in accordance with the present invention.

Various options may be provided to the user in newsgroup message display screen 202. For example, reply icon 208, if selected, may allow the user to post a reply message to the currently displayed newsgroup message on the newsgroup message server. Save icon 210, if selected, may allow the user to save the currently displayed newsgroup message. The newsgroup message may be saved locally in memory 25 of set-top box 26. If desired, the newsgroup message may be saved to a computer coupled to set-top box 26. If desired, any other suitable method of saving a message may be used. Forward icon 212, if selected, may send the currently displayed message to another particular user. This may be accomplished through the use of e-mail, instant messaging, or any other suitable method of message transmission. These features are described in in commonly assigned U.S. patent application Ser. No. 09/356,245 (Pamela L. McKissick, et al.), which is hereby incorporated by reference in its entirety. Post icon 214, if selected, may allow the user to post a new newsgroup message in the present newsgroup forum. The difference between reply icon 208 and post icon 214 may be that when replying, the new newsgroup message may be threaded as a reply to the currently displayed message. Posting, however, may start a new thread of newsgroup messages. Next icon 216, if selected, may cause the next newsgroup message from the listing of newsgroup messages the currently displayed newsgroup message was selected from, to appear. Likewise, previous icon 218, if selected, may cause the previous newsgroup message from the listing of newsgroup messages the currently displayed newsgroup message was selected from, to appear. Thread icon 220, if selected, may cause the next newsgroup message in the thread of newsgroup messages to which the currently displayed newsgroup message belongs to appear. Delete icon 209, if selected, may cause the currently displayed newsgroup message to be removed from any listing the current user may view (although the current newsgroup message will still remain in the newsgroup for other users to view). Block thread icon 211, if selected, may cause the entire thread that the presently displayed newsgroup message belongs to be removed from any listing the current user may view (although the thread will still remain in the newsgroup for other users to view). Block sender icon 213, if selected, may cause all newsgroup messages posted by the sender of the currently displayed newsgroup message to be removed from any listing the current user may view (although the newsgroup messages posted by the sender will still remain in the newsgroups for other users to view). The options provided in FIG. 9 are merely illustrative. Any other suitable options may be provided instead of, in addition to, or in combination with any of those presented.

Figure 10:
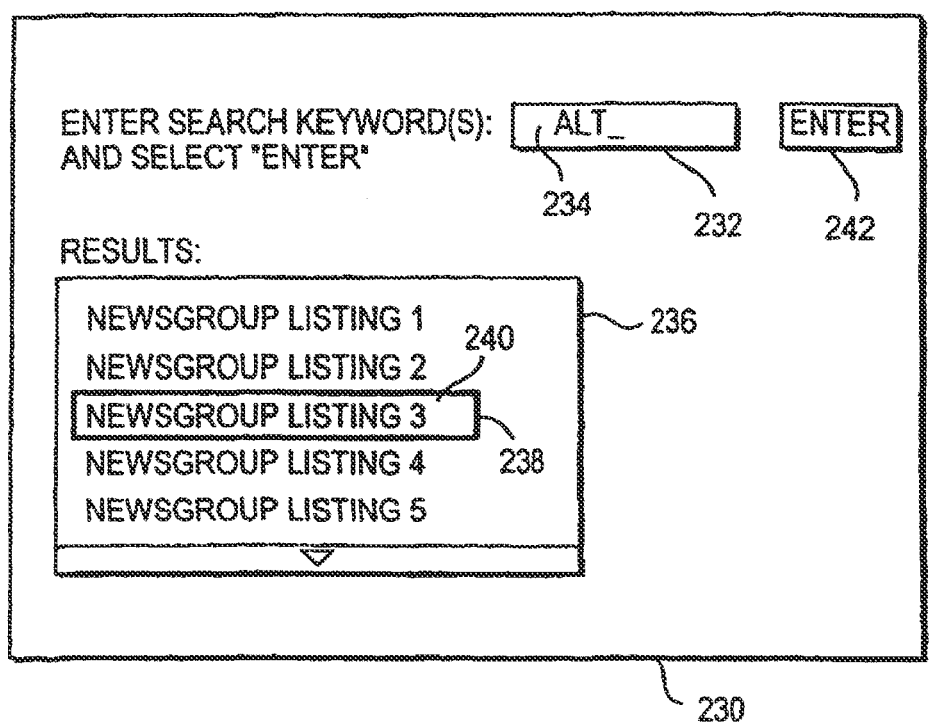
FIG. 10 shows an illustrative newsgroup search display screen in accordance with the present invention.

Program guide screen 130 in FIG. 4 provides the user with newsgroup search icon 132. If newsgroup search icon 132 is selected, newsgroup search screen 230 in FIG. 10 may be displayed to the user. Newsgroup search screen 230, may, if desired, be displayed in the form of an overlay window, which overlays program guide screen 130. If desired, all newsgroup interactions as described herein may be accomplished through overlay windows, including displaying newsgroup message listings, newsgroup message contents, etc. For brevity, newsgroup related displays are described in terms of display screens.

Newsgroup search screen 230 may allow the user to enter keyword(s) 234 into text box 232 in accordance with the present invention. After pressing an "enter" button on the remote control or selecting enter icon 242, a list of available newsgroups that are associated with keyword(s) 234 may be displayed in results area 236. Highlight region 238 may be navigated by the user among the newsgroup listings of results area 236. If the user wishes to view the newsgroup message listings of the newsgroup represented by newsgroup listing 240, the highlight region may be placed over newsgroup listing 240 and a selection may be performed. This may result in a screen such as screen 170 of FIG. 7 being displayed in accordance with the present invention.

Newsgroup search screen 230 and the arrangement of elements provided therein is merely illustrative. Any other suitable arrangement may be used, including the use of previously used keywords, suggested keywords based on user preferences, etc. If desired, a search screen for newsgroup messages in a particular newsgroup forum, or among multiple newsgroup forums may be similarly implemented and arranged.

Figure 11:
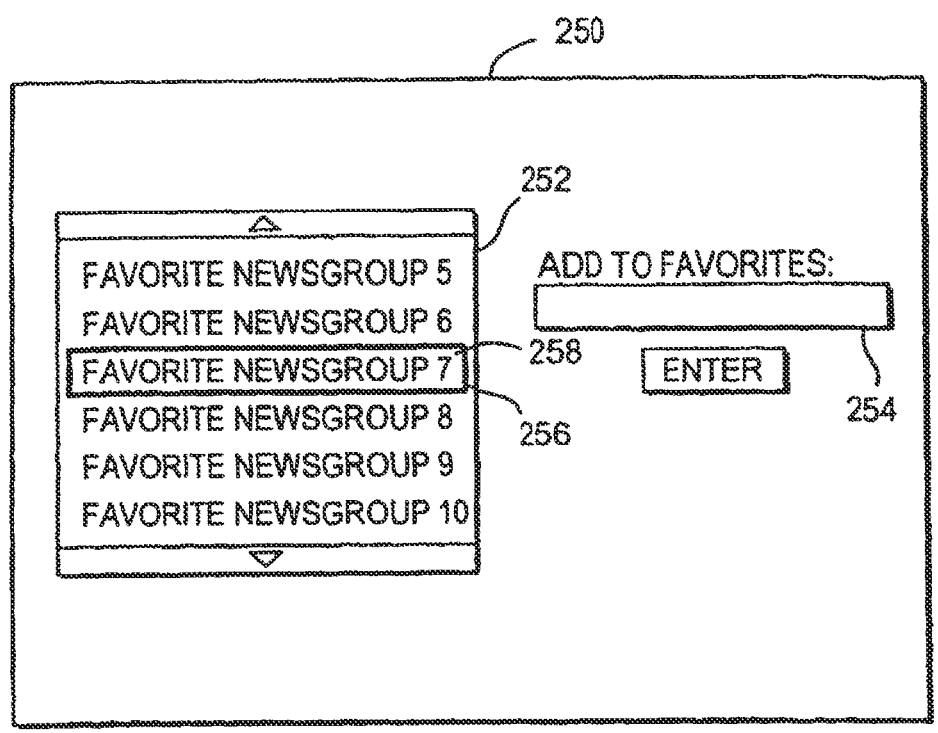
FIG. 11 shows an illustrative favorite newsgroup display screen in accordance with the present invention.

Program guide screen 130 in FIG. 4 provides view favorites icon 134, which, if selected, may cause display screen 250 in FIG. 11 to appear. Display screen 250 may contain favorite newsgroup listings 252. The user may move highlight region 256 among the favorite newsgroup listings 252 and may select any of the listed favorite newsgroups in accordance with the present invention. Once selected, the newsgroup messages for the selected newsgroup may be displayed in accordance with the present invention.

Figure 12A:
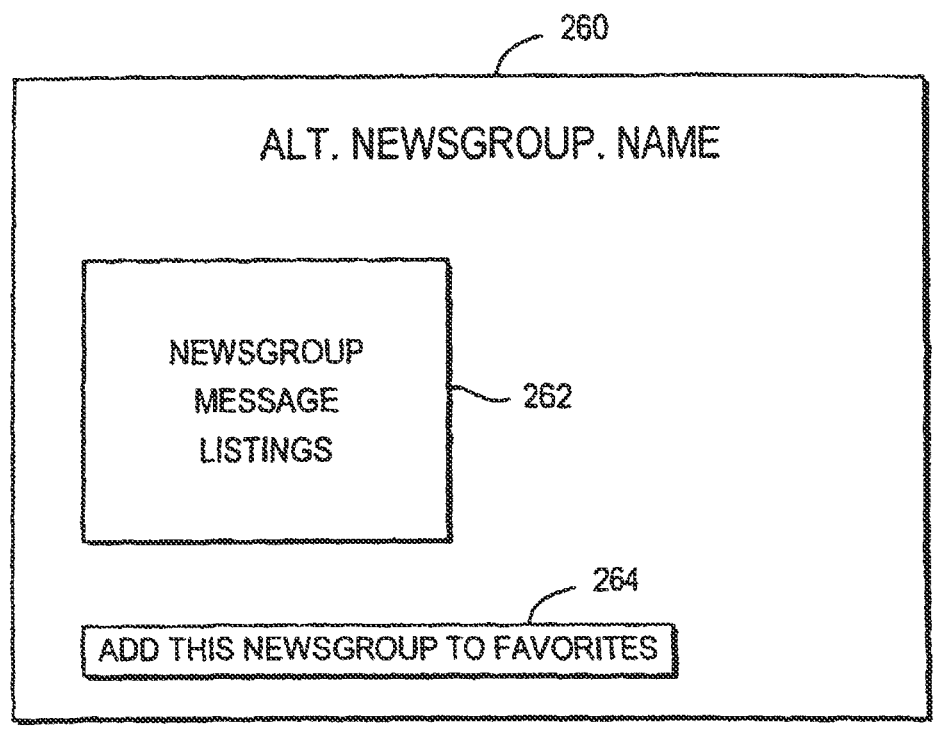
FIG. 12A shows an illustrative interactive television application display screen with an favorite newsgroup option in accordance with the present invention.

Text box 254 may be provided to allow the user to enter additional newsgroups to add to the newsgroup favorites list 252. The user may enter the name of a newsgroup to add in text box 254. If desired, the user may be given additional opportunities to add newsgroups to a favorite newsgroups list. For example, in FIG. 12A, newsgroup message listings screen 260 may provide the user with a selectable element 264 that would allow the newsgroup whose newsgroup messages are listed in newsgroup message listings 262 to be added to the favorites list. If desired, anytime the user is viewing the newsgroup message listings of a particular newsgroup, an "Add to Favorites" button may be pushed on the remote control to add that particular newsgroup to the favorites list.

Figure 12B:
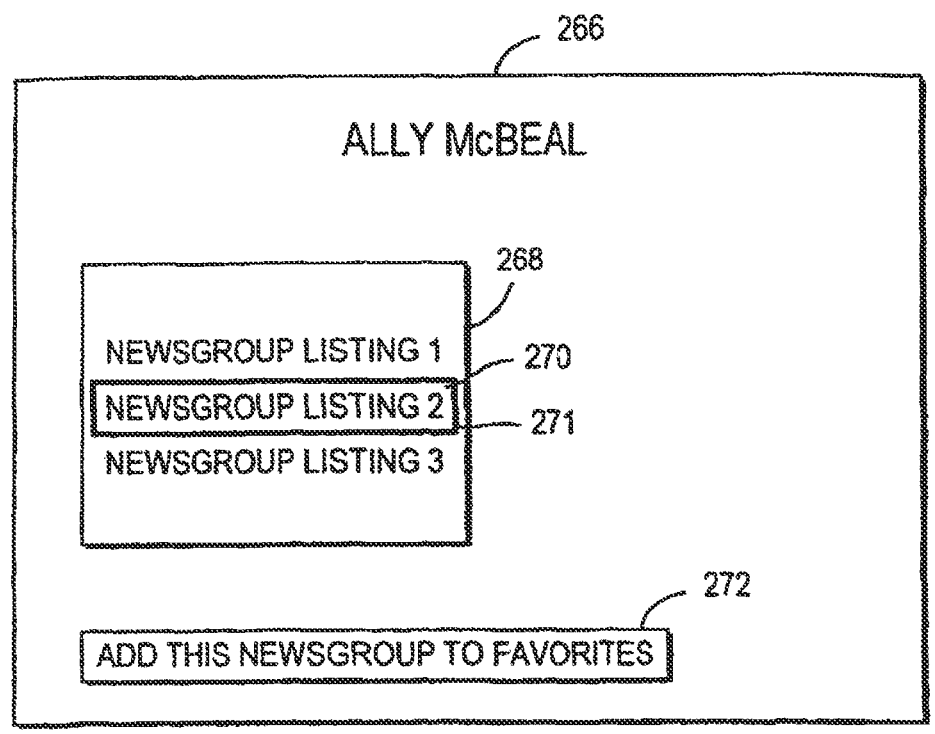
FIG. 12B shows an illustrative interactive television application display screen with an favorite newsgroup option in accordance with the present invention.

FIG. 12B shows another way in which newsgroups may be added to a favorites list. Newsgroup listing display screen 266 may display newsgroup listings 268. If the user wishes to add newsgroup listing 270 to the favorites list, the user may place highlight region 271 over newsgroup listing 270 and may select icon 272.

These are only illustrative ways in which newsgroups may be placed into a favorite newsgroups listing. Any other suitable way of providing the user with opportunities to build a favorite newsgroup collection may be used.

Each member of a household may have his or her own favorite newsgroups list. To identify the current user, the interactive television application may allow each user to log in using an identification parameter (e.g., a user id). If desired, a household may have multiple lists of favorite newsgroups whereby one of the favorite newsgroup lists may be selected from a menu of all of the available favorite newsgroup lists. Any other suitable arrangement may be used.

Figure 13:
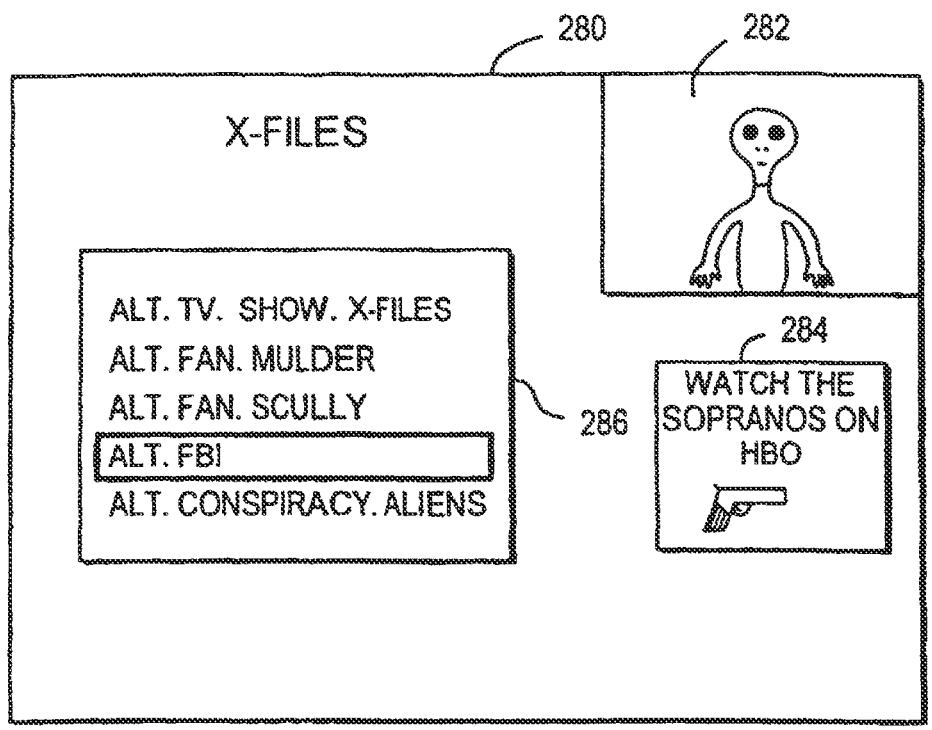
FIG. 13 shows an illustrative interactive television application display screen with newsgroup listings and a video region in accordance the present invention.

In one of the embodiments of the present invention, the user may be allowed to view television programming and interact with newsgroups, simultaneously. This is illustrated by display screen 280 in FIG. 13. A television program 282 may be displayed in a section of display screen 280 while newsgroup listings 286 is displayed in another section of display screen 280. Newsgroup listings 286 contain newsgroup listings that are related to the television program 282. For example, if television program 282 is an episode of the X-Files, then the newsgroups listed in newsgroup listings 286 may all have something to do with the X-Files or related subject matter. An advertisement 284 may also be provided, which may be related to television program 282, or which may not necessarily be related to television program 282. Advertisement 284 may be interactive or it may be passive. Advertisement 284 may be in the form of text, graphics, video, or any other suitable form.

Figure 14:
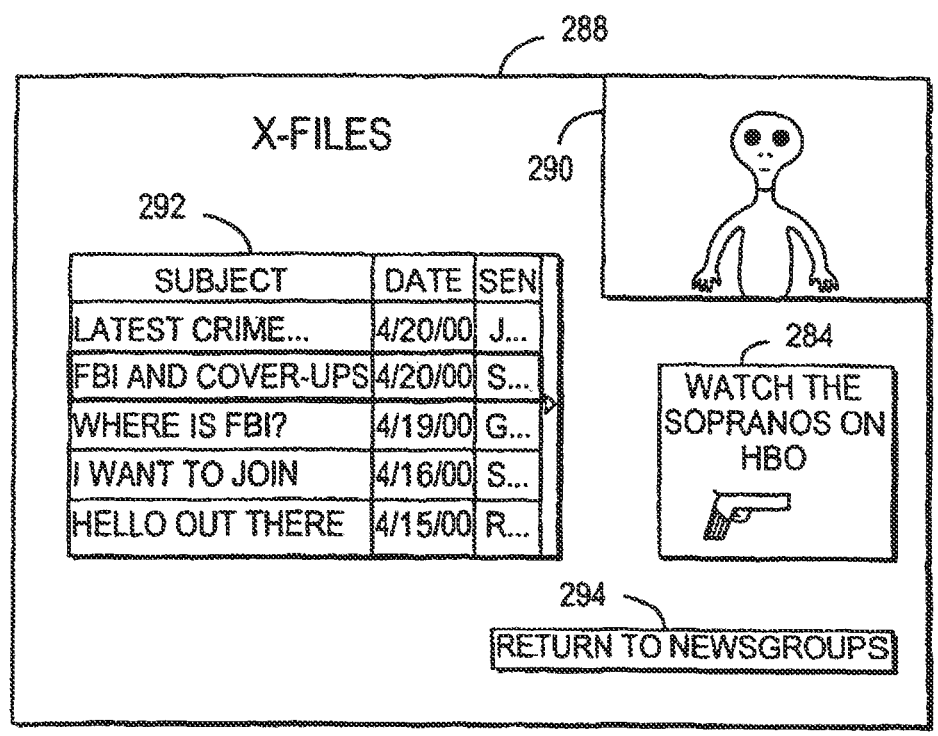
FIG. 14 shows an illustrative interactive television application display screen with newsgroup message listings and a video region in accordance with the present invention.

The user may select a newsgroup listing from newsgroup listings 286 in accordance with the present invention. Once selected, display screen 288, shown in FIG. 14, may be presented to the user. Television program 290 may be broadcast as the user parses through the newsgroup message listings 292 of the newsgroup the user selected from screen 280. If the user wishes, he or she may select icon 294 to return to screen 280.

Figure 15A:
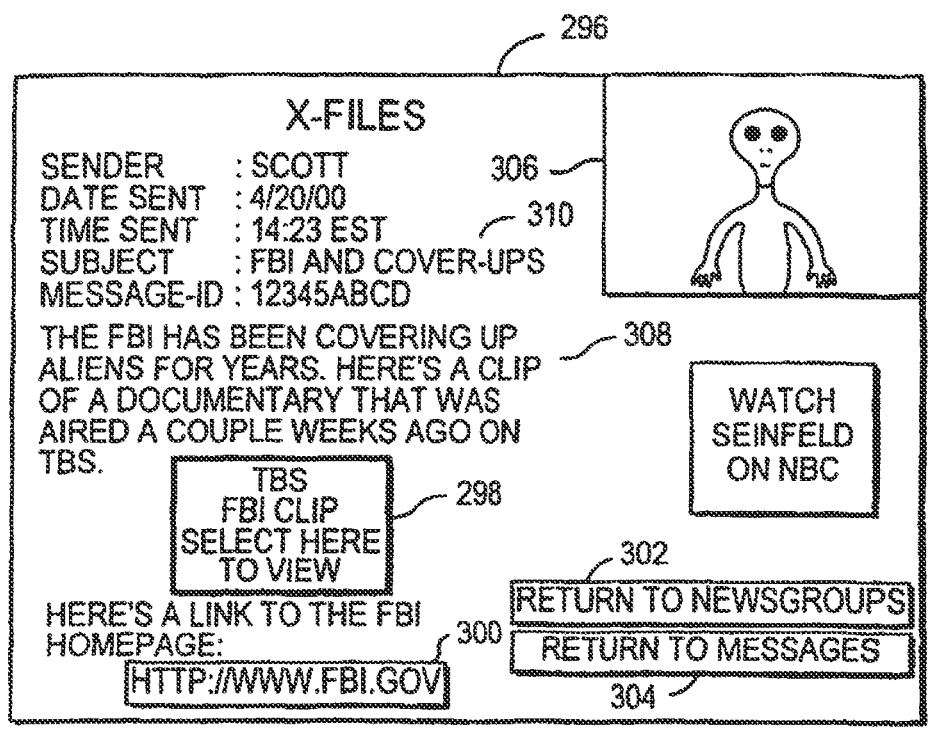
FIG. 15A shows an illustrative interactive television application display screen with a newsgroup message having links to attachments and a video region in accordance with the present invention.

Once a user selects a newsgroup message from newsgroup message listings 292, the content of the message may be displayed as illustrated in FIG. 15A. Display screen 296 may display a television program 306 while simultaneously displaying newsgroup message content 308. If desired, a message header 310 may also be displayed.

Figure 16:
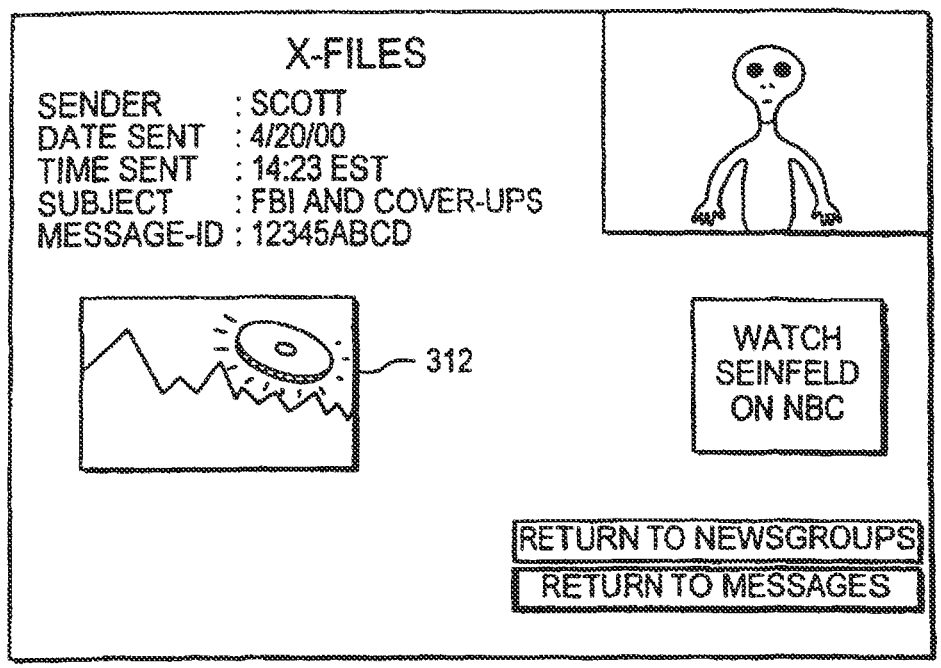
FIG. 16 shows an illustrative interactive television application display screen with a video file playing application and a video region in accordance with the present invention.

If desired, newsgroup messages may contain files. The files may contain video, text, graphics, audio, or any other suitable digital content. When reading a message, the file may be represented by an icon such as video file icon 298. The user may open the file by selecting the file icon in accordance with the present invention. For example, if the user wishes to view the video clip described in newsgroup message 308, the user would select video file icon 298, which may in turn open an application capable of playing that particular type of video file. In the illustrated example, the video clip stored in the video file may begin playing as shown in FIG. 16. The video clip 312 may be played in an overlay or it may take the place of message 308. If desired, the video clip may be placed in an unused portion of the screen so that message 308, television program 306, and video clip 312 are all simultaneously viewable. If video clip 312 has associated audio, then the audio associated with television program 306 may be muted while the video clip audio is played. If desired, the active audio may be selected by the user using an options feature.

If the video clip took the place of other content of the display screen, once it the video clip is finished playing, it may disappear, allowing the other content to be displayed again. This may result in display screen 296 being shown after the video clip has ended.

Figure 17:
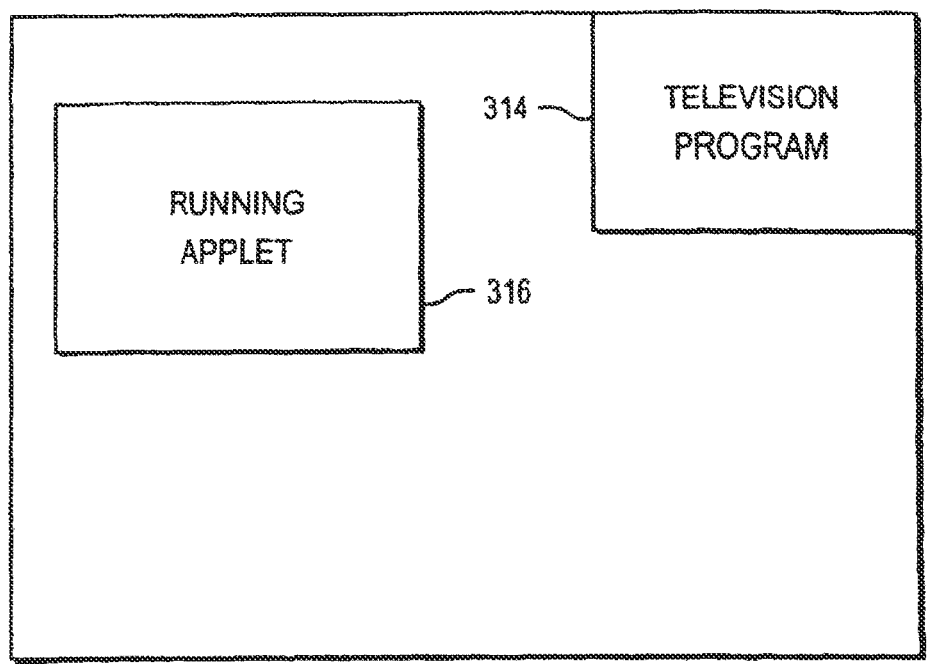
FIG. 17 shows an illustrative interactive television application display screen with a running applet and a video region in accordance with the present invention.

Newsgroup message 308 may also contain links to web pages. Link 300 is illustrated. The user may select link 300, which may result in a web browser being activated. The browser may automatically open the web address specified by link 300. If desired, other types of content may be transmitted within a newsgroup message. For example, applets (e.g., Java, Visual Basic, etc.) may be transmitted. An icon may represent each applet. If selected, the applet may be loaded and run from the set-top box. Typically, such applets may include games, interactive features, applications, animations, etc. FIG. 17 illustrates applet 316 and television program 314 being displayed simultaneously.

Figure 15B:
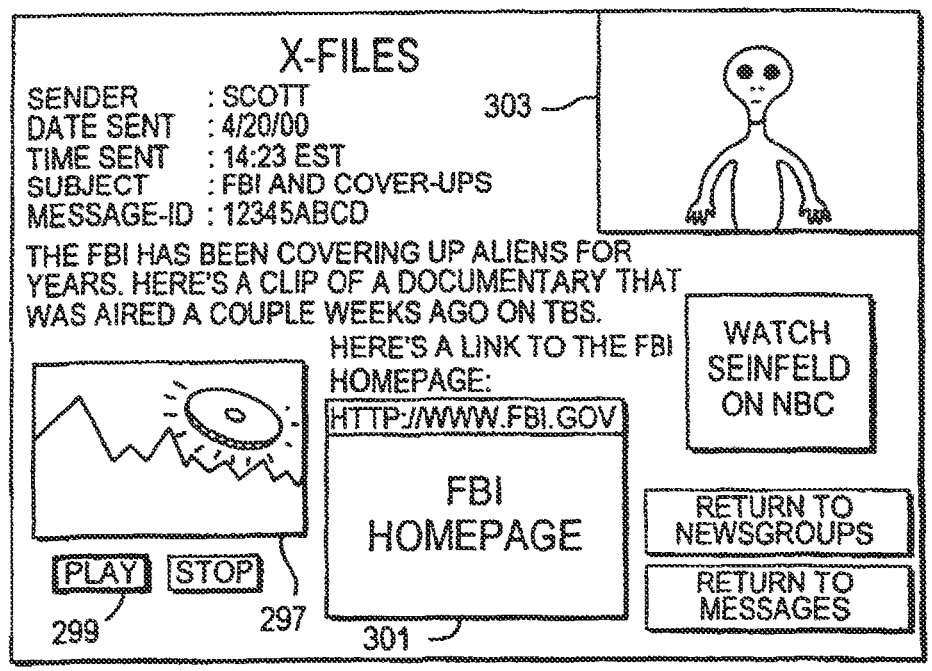
FIG. 15B shows an illustrative interactive television application display screen with a newsgroup message that automatically activated applications and a video region in accordance with the present invention.

If desired, when a user opens a newsgroup message for viewing, any attached files may automatically be opened by their respective applications. For example, FIG. 15B shows the same newsgroup message that FIG. 15A shows. The newsgroup message in FIG. 15B, however, has automatically activated a video playing application 297 and has activated a web browser 301 because a video file was attached to the newsgroup message and a web link was provided in the newsgroup message respectively. These applications may be provided while television program 303 is playing in a reduced sized window. Video application 297 may also provide a play icon 299 so the user may play the video file attached to the newsgroup message at his or her convenience. Either automatic activation of attached files and their respective applications or manual activation of attached files and their respective applications, as illustrated in FIGS. 15B and 15A, respectively, may be selected by the user in a set-up routine based on preference. If desired, certain types of files may be chosen to be opened manually, while other types of files may be chosen to be opened automatically. Any such suitable arrangement or implementation may be used.

Another feature of the newsgroup feature of the present invention is allowing the user to quickly and easily access newsgroups while watching television programming. If desired, the user may view a television program in full screen. If, at any time, the user wishes to access the newsgroup feature of the interactive television application, the user may be given the ability to do so. For example, if the user is watching X-Files in full screen and wishes to read newsgroup messages while continuing to watch X-Files, the user may issue a view newsgroups command. This command may take the form of pressing a "News" button on the remote control, wireless keyboard, or any other suitable device. If desired, the user may enter an options menu by pressing an "options" button on the remote control and selecting an option to view newsgroups from the options menu. These methods of allowing a user to activate the newsgroup features of the present invention are merely illustrative. Any other suitable method may be used. Once the newsgroup feature is activated, the user may use the feature in accordance with the present invention.

Figure 18:
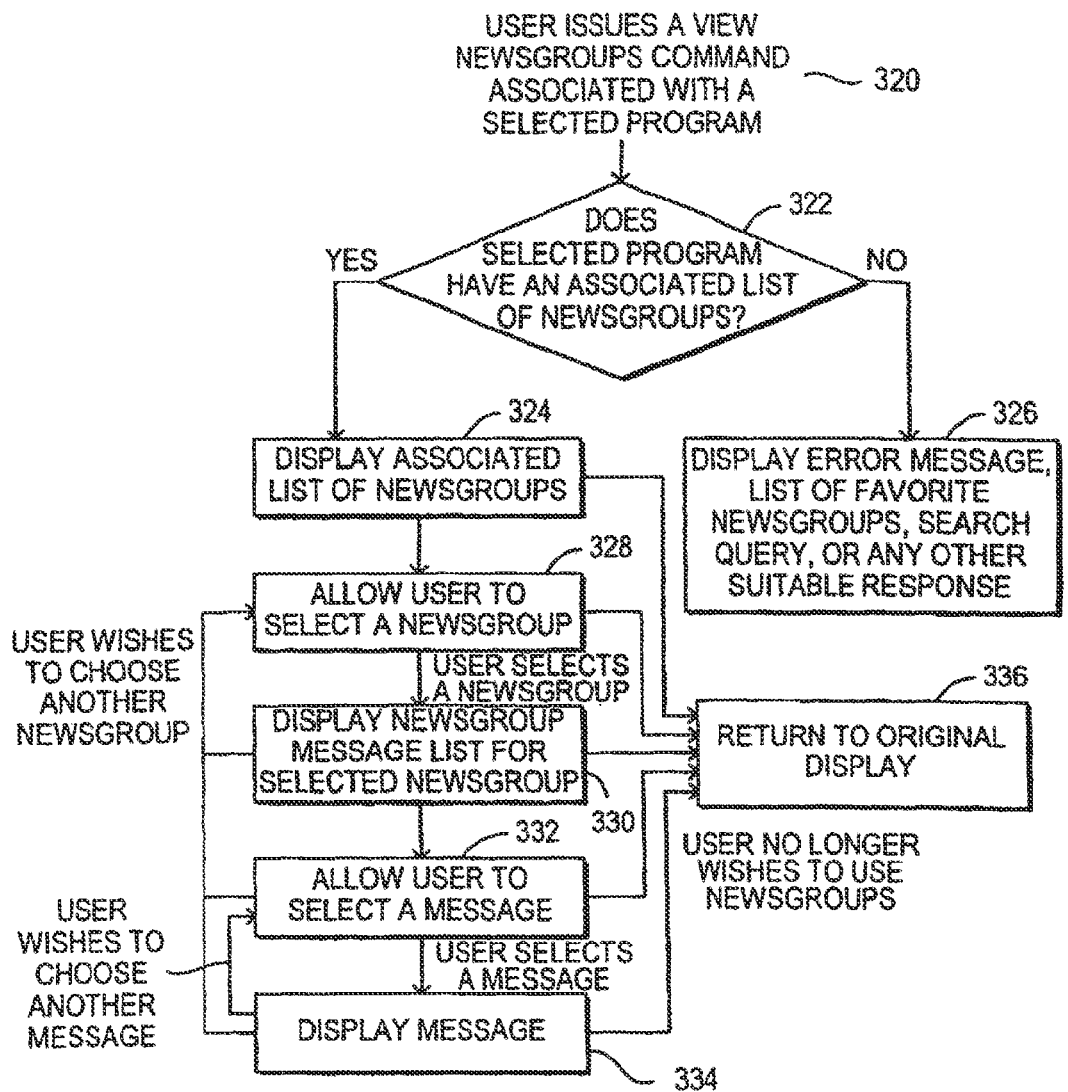
FIG. 18 is a flow chart of illustrative steps involved in allowing a user of the interactive television application to access newsgroup messages in accordance with the present invention.

FIG. 18 illustrates some of the steps for using the newsgroup feature. At step 320, a user may issue a view newsgroups command (e.g., using the remote control) for a selected television program. The set-top box may query the newsgroup server at step 322 (e.g., at the television distribution facility) as to whether there are any newsgroups associated with the selected television program. If there is at least one associated newsgroup, then at step 324 the associated newsgroups are displayed to the user and the user may choose a newsgroup from among those available (step 328). If the user selects a newsgroup, the newsgroup messages in the selected newsgroup may be listed at step 330 and the user may choose a newsgroup message from among those available (step 332). If the user selects a newsgroup message then the selected newsgroup message may be displayed at step 334. If the newsgroup message contains any files, the user may open them in accordance with the present invention.

If the user wishes to view another newsgroup message, the user may select a "next" option (e.g., from a selectable element from the screen, from pressing a button on the remote control, etc.) or a "previous" option, or any other suitable option for traversing the newsgroup messages of the currently selected newsgroup. If desired, the user may select an option to display the list of newsgroup messages again where the user may choose another newsgroup message to view (step 332). Similarly, at step 332, the user may decide to view a newsgroup message from a newsgroup different from the currently selected newsgroup. The user may, at that point, select a selectable element, such as an icon, from the display screen. This may cause the newsgroup list to be displayed again, allowing the user to select another newsgroup (step 328).

If, at step 322, it is determined that there are no associated newsgroups with the selected television program, then any suitable response may be given. The response may be in the form of displaying an error message, displaying the favorite newsgroup list for that user, displaying a search form, or doing any other suitable action if there are no associated newsgroups. If desired, an option to create a new newsgroup related to the selected television program may be provided.

If desired, a dynamic hot linking feature may be used with newsgroups. For example, as the user changes television channels, program listings, or any other content displayed on the display screen, the list of related newsgroups may change accordingly so that the displayed newsgroup listings are always related to the content being viewed.

The preceding description of displaying newsgroups associated to a presently displayed television program is merely illustrative. If desired any other suitable method may be used. For example, upon the user issuing a view newsgroup command, newsgroup listings related to the television program, or any other content the user was viewing, may be displayed. Furthermore, the use of a television program was used for brevity. For example, the newsgroup feature may be similarly accessed by a user who is using a program guide and has selected a program or class of programs (e.g., movies), or has selected any other suitable programming-related item (e.g., actor, director, channel, etc.).

The user may issue any suitable exit command at any point. This may cause all of the newsgroup information to go away, and may cause the original display screen to be displayed as it was displayed prior to the newsgroup activation (step 336).

Figure 19:
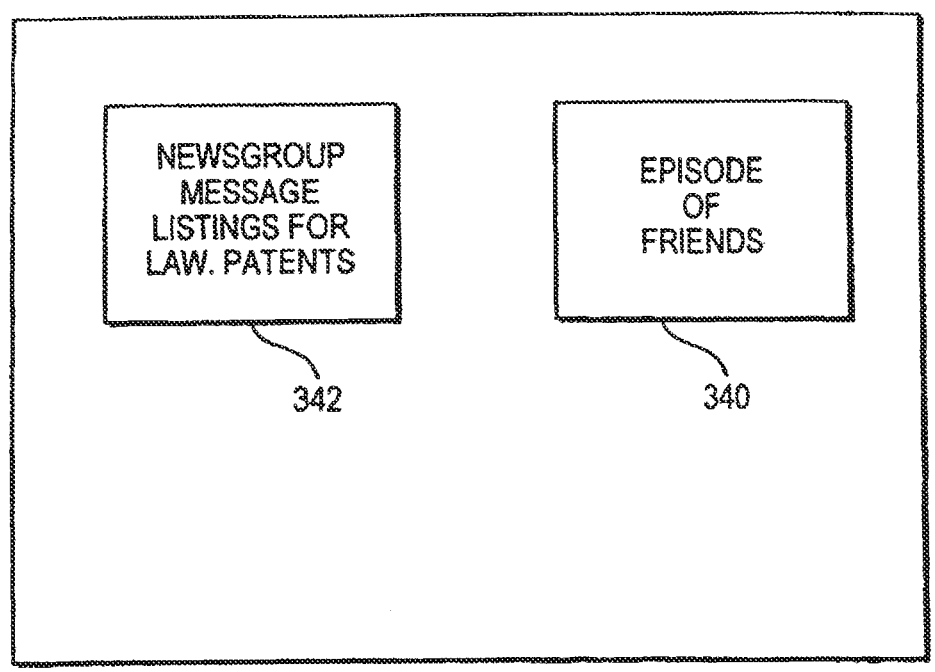
FIG. 19 shows an illustrative interactive television application display screen with newsgroup message listings related to one subject and a video region with video related to another content in accordance with the present invention.

The interactive television application may also allow the user to go directly to a newsgroup option, not directly related to the selected television program or to the television program being viewed. In that case, the interactive television application may allow the user to continue watching television while accessing any available newsgroup related to any available topic. FIG. 19 illustrates this feature. Television program 340 is an episode of Friends, while the newsgroup 342 being viewed simultaneously is about patents. More generally, any screen in the interactive television application may have a video window. The video shown in the video window need not necessarily be related to any of the content of the display screen in which the video window is displayed. The video window may be used to display the television program (or television channel) the user was currently watching (or tuned to). For example, FIG. 4 may include a video window displaying the current television program that was being viewed. This video window may be carried through the display screens shown in FIGS. 5, 6A, 6B, and any other subsequent screens.

Figure 20:
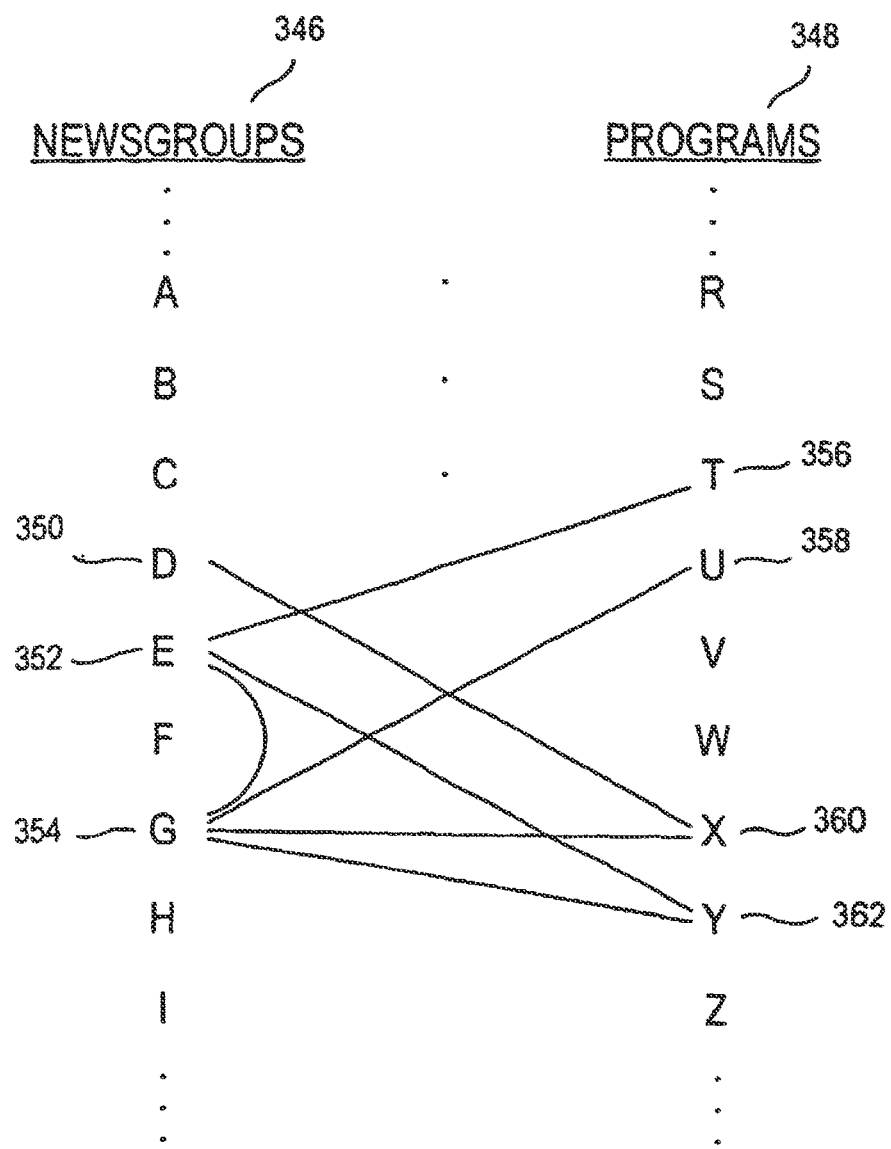
FIG. 20 is a graph illustrating the cross-reference relationship between newsgroup and television programs in accordance with the present invention.
Figure 21:
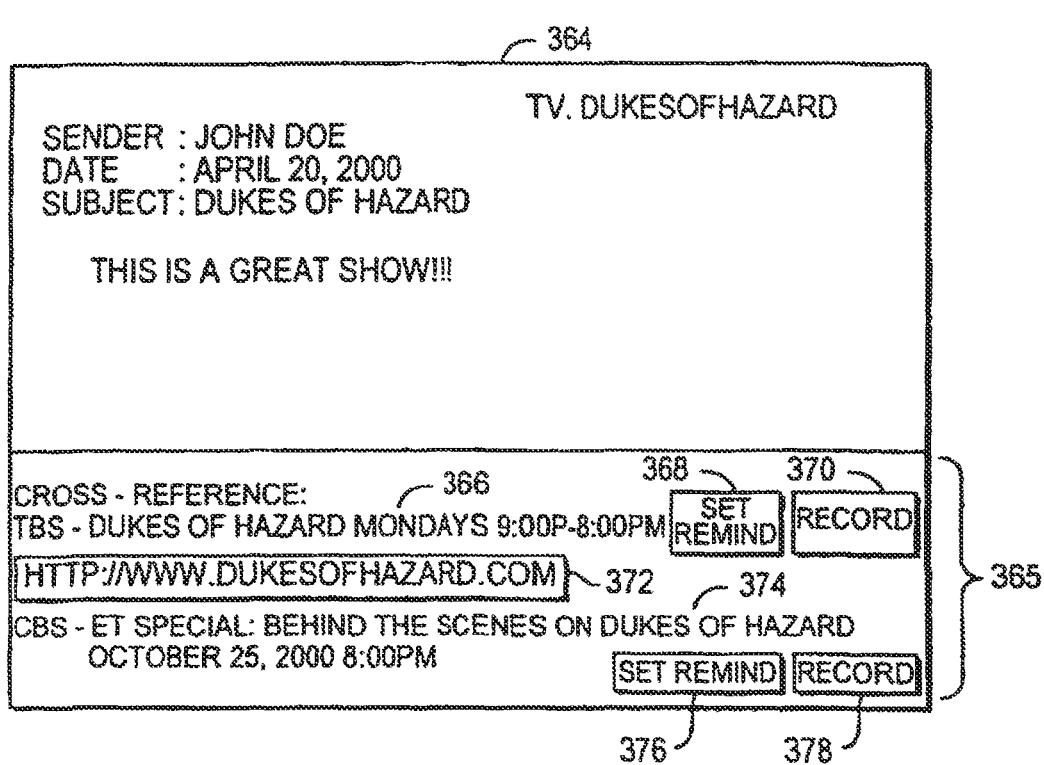
FIG. 21 shows an illustrative interactive television application display screen with a newsgroup message and cross-reference listings in accordance with the present invention.

If desired, not only may each television program, program guide category, etc. have associated newsgroups, but the newsgroups may be cross-referenced as well. That is, each newsgroup (or a selection of newsgroups) may have television programs, program guide categories, actors, directors, etc. associated with it. This feature is illustrated in FIG. 20. A bipartite graph, with newsgroups 346 on one side and television programs 348 on the opposite side is used to illustrate the cross-referencing of newsgroups with television programs. For example, newsgroup 350 may be cross-referenced to television program 360. Newsgroup 352 may be cross-referenced to television programs 356, 362, and newsgroup 354. Newsgroup 354 may be cross-referenced to newsgroup 352, and television programs 358, 360, and 362. Newsgroups may be cross-referenced to any other suitable content. Television programs were used for illustrative purposes. The user may be given the ability to access anything that a newsgroup or newsgroup message is cross-referenced to. For example, FIG. 21 shows an illustrative display screen for viewing a newsgroup message. The user may be given a list 365 of cross-reference content that may be related to the current newsgroup or newsgroup message. For example, in the illustrated example, a newsgroup devoted to The Dukes of Hazard is being accessed by the user. A cross-reference list 365 may be provided that lists any other available content related to The Dukes of Hazard. For example, a program listing 366 for the show itself may be provided. The program listing 366 may be selectable. If the user selects program listing 366, an information screen may be displayed, giving the user additional information about the television program. A remind icon 368 and record icon 370 may also be provided adjacent to program listing 366 that would allow the user to set a remind or program a recording, respectively, of the television program represented by programming listing 366.

Also available via the cross-reference feature may be a web link 372 that may direct the user to a web page related to The Dukes of Hazard. The user may select web link 372, which may cause a web browser to be activated and displayed, showing the contents of http://www.dukesofhazard.com.

Special television events may also be cross-referenced. Cross-reference list 365 may include a television program listing such as television program listing 374 related to a television special on The Dukes of Hazard. If desired, the user may be given the opportunity to set a reminder or to program a recording of this television program. This may be accomplished by allowing the user to select set remind icon 376 or record icon 378, respectively.

The cross-reference feature of FIG. 21 is merely illustrative. Any other suitable arrangement may be used. If desired, the user may access the cross-reference material by pressing a "Cross-Reference" button on the remote control, causing an overlay to appear, etc. If desired, the cross-reference may be accessed by the user when the user is viewing any other type of content (e.g., while watching a television program, while browsing the web using set-top box 26, etc.). In that case, the cross-reference may display other content related to the subject matter of the content currently being viewed.

Cross-referencing may be done automatically or manually. When done automatically, the cross-reference process may be performed once an hour, once a day, once a week, or at any other periodic cycle. The cross-referencing may be done for a variety of different subject matters. The results of the cross-referencing may be used to update a database of cross-reference information that may be stored in newsgroup equipment 22 in television distribution facility 16. The database of cross-reference information may likewise be stored and updated at any other suitable location, such as main facility 12, or user television equipment 20. If desired, the cross-referencing may be performed upon activation by personnel at the television distribution facility or any other suitable location. The personnel need not be at the same location as the cross-reference database, but may access and activate routines from a remote location.

If desired, cross-referencing may be performed on a continuous basis. When cross-referencing is performed on a continuous basis, a server (which may be part of newsgroup equipment 22) may be constantly monitoring various sources of content and grouping related items among the various sources using appropriate data structures (e.g., graphs, adjacency matrices, etc.).

If desired, cross-referencing may take place on demand. For example, as a user accesses a content related to a particular subject matter, set-top box 26 may send a cross-reference request to the newsgroup equipment 22 in television distribution facility 16 (or other equipment in television distribution facility 16 or elsewhere). In response, a cross-referencing process may be executed at television distribution facility 16 (or elsewhere), sending to set-top box 16 the list of related content from among the various sources looked at during the cross-referencing process. The cross-referencing process may access information stored at other locations besides television distribution facility 16. For example, main facility 12 may be accessed to search through program guide database 14 in the cross-referencing process.

Figure 22:
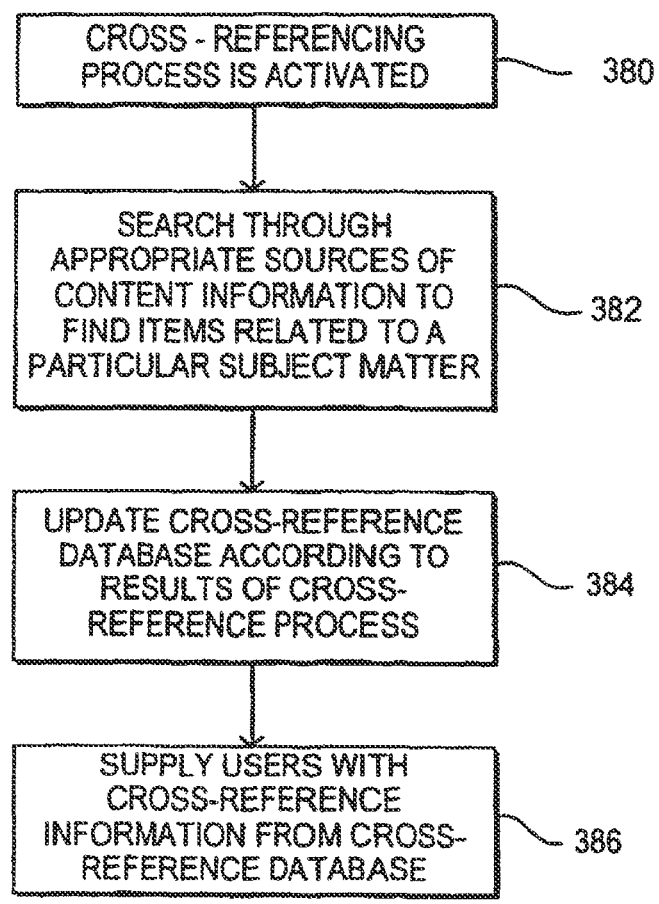
FIG. 22 is a flow chart of illustrative steps involved in maintaining cross-reference information in accordance with the present invention.

A simplified model of the above-mentioned cross-referencing process is illustrated in FIG. 22. At step 380, a cross-referencing process is activated (e.g., as a result of a periodic cycle). The cross-referencing process may, at step 382, search through appropriate sources (e.g., program guide database 13 at main facility 12, Usenet databases on the Internet, etc.) looking for content related to a particular subject matter (e.g., The Dukes of Hazard). At step 384, a database of cross-reference information may be updated to reflect the results of the search performed at step 382. At step 386, users who are viewing a particular newsgroup, television program, information about a television program, etc. may be given the cross-reference information related to the subject matter of the content they are viewing. This cross-reference information may take the form of cross-reference list 365 or any other suitable form. This is an illustrative model for the cross-referencing feature of the interactive television application. Any other suitable model for cross-referencing may be used.

Figure 24:
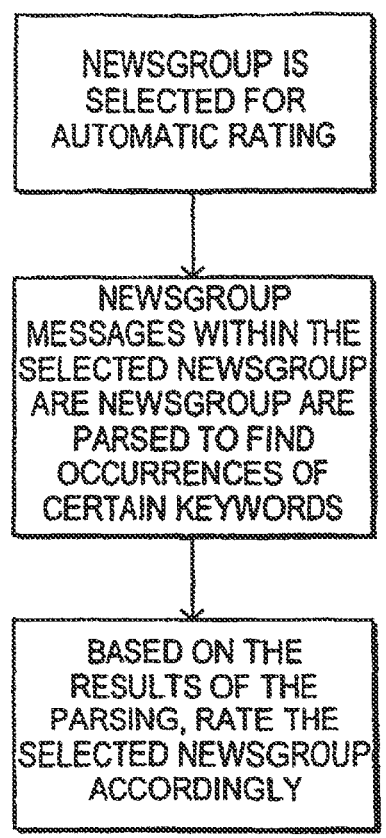
FIG. 24 is a flow chart of illustrative steps involved in automatically rating newsgroups in accordance with the present invention.

Another feature of the interactive television application relates to parental control options the user may have with regard to newsgroups. For example, newsgroups may be rated with parental control ratings. These ratings may be similar to those used for television programs or similar to those used for movies. If desired, any suitable rating system may be used for newsgroups. FIG. 23 illustrates a rating system that may be used. The ratings may be added manually or automatically. If added automatically, the newsgroup messages within a newsgroup that is being rated may be parsed to identify the language being used. For example, certain keywords may be searched for, and if a predetermined number of occurrences of any of these words are found, the rating for the newsgroup may be adjusted accordingly. This is merely an illustrative method for automatically rating newsgroups and is outlined in FIG. 24. Any other suitable method may be used.

If newsgroups are rated manually, personnel at the television distribution facility may manually go through the newsgroup messages in a particular newsgroup to objectively determine the most appropriate rating for the newsgroup (preferably based on certain guidelines). If desired, the parents of a household may manually define ratings for newsgroups based on their own subjective beliefs. If desired, any other suitable method for manually rating newsgroups may be used.

If desired, parents may block any newsgroup that is a particular rating from being viewed by children in the household.

In another embodiment, newsgroups may be categorized as being either moderated newsgroups or unmoderated newsgroups. Moderated newsgroups may have human moderators who receive all newsgroup messages before they are posted for public viewing. Each newsgroup message may be examined and edited by the moderators to sustain a content rating that is appropriate for a general audience. If desired, newsgroup moderators may moderate particular newsgroups for different ratings and edit newsgroup message content accordingly. The moderators may also maintain the newsgroups so that only those messages that are related to the subject matter of the newsgroups may be posted. In addition, moderators may check any attachments to newsgroup messages (e.g., video clips, audio, applets, text, graphics, etc.). Any inappropriate attachments may be removed by the moderators.

Figure 25:
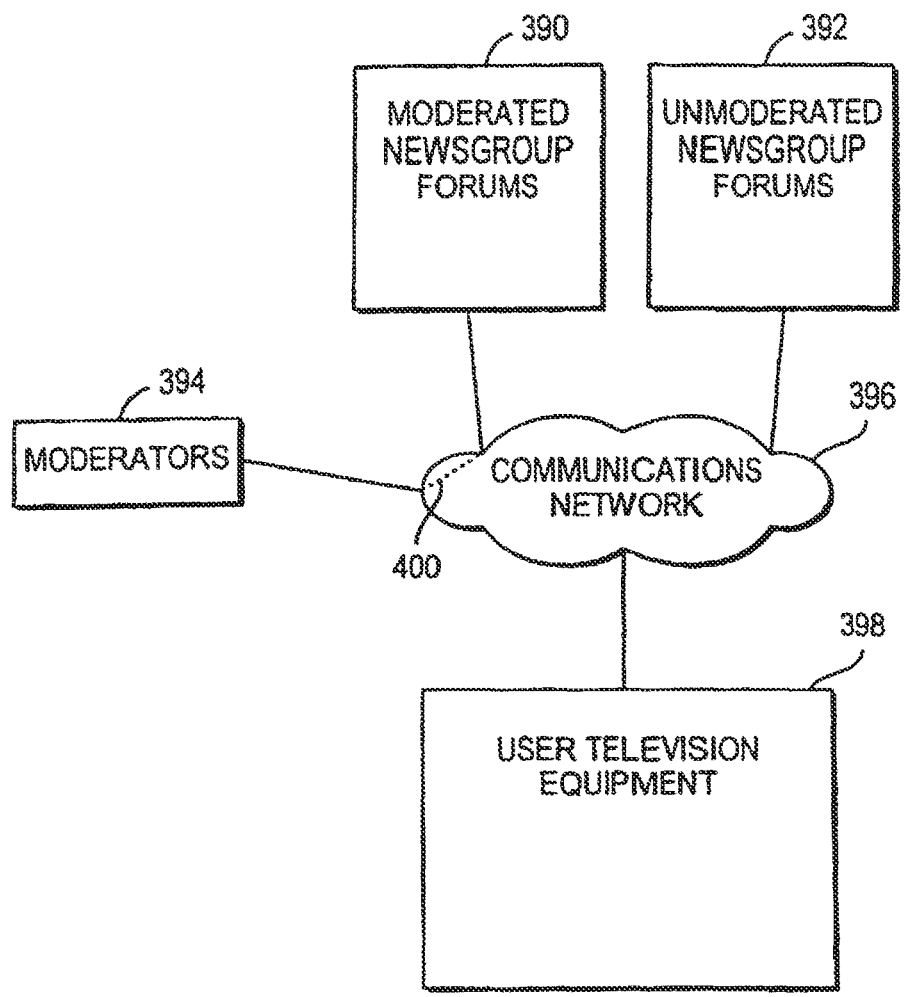
FIG. 25 is a diagram of an illustrative system having moderated newsgroups and unmoderated newsgroup forums in accordance with the present invention.

The moderated newsgroup system is illustrated in FIG. 25. The user television equipment 398 may access moderated newsgroups 390 and unmoderated newsgroups 392 via a communications network 396. If desired, communications network 396 may include one or more television distribution facilities. Moderators 394 may access moderated newsgroups 390 via communications network 396, using a connection 400. Connection 400 may include a personal computer coupled to moderated newsgroups 390 using an Internet connection, a modem connection, local area network, or any other suitable connection. If desired, moderators 394 may be directly connected to the server or servers storing moderated newsgroups 390. As users (e.g., from user television equipment 398, from personal computers via an Internet connection, etc.) post newsgroup messages to moderated newsgroups 390, the moderators may intercept the newsgroup messages, make the appropriate changes, and may then post the newsgroup messages in the designated newsgroups. Unmoderated newsgroups 392 may also be provided via communications network 396. This is merely an illustrative arrangement of moderated newsgroups and unmoderated newsgroups. Any other suitable arrangement may be used.

Figure 26:
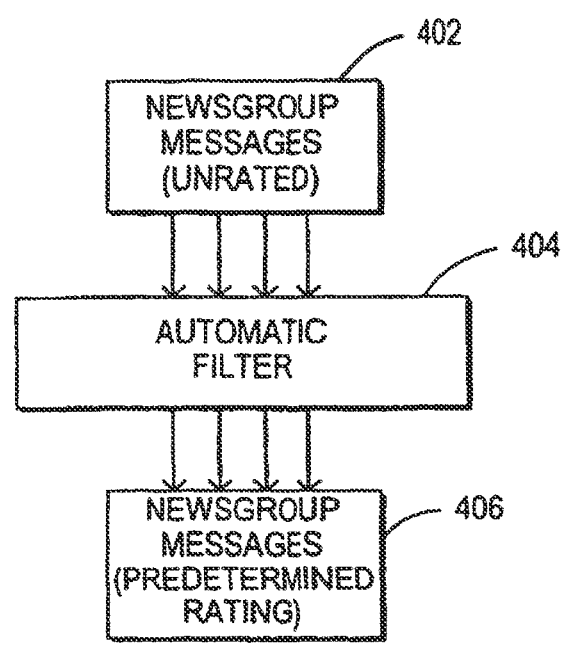
FIG. 26 is a diagram of an illustrative system involving the use of an automatic filter to maintain a constant rating for newsgroups in accordance with the present invention.

If desired, an automatic filter may be used to filter newsgroup messages to conform to a particular rating. FIG. 26 shows unfiltered newsgroup messages 402 being fed into automatic newsgroup message filter 404. Automatic newsgroup filter 404 may parse through the newsgroup messages, searching for particular keywords that may be inappropriate for the particular rating of the newsgroup (or newsgroups) with which each newsgroup message is associated with. Automatic filter 404 may remove these keywords or replace them with less offensive synonyms or symbols (e.g., asterisks). If desired, automatic filter 404 may remove the newsgroup message (or move it to a related unmoderated newsgroup) if a predefined threshold of an allowable number of inappropriate words is exceeded. Newsgroup messages 406 may be outputted by automatic filter 404 with a high reliability that the language meets the predetermined rating for the associated newsgroups. This is merely an illustrative automatic newsgroup message filter. Any other suitable newsgroup message filter may be used. For example, a filter that simply removes any inappropriate words, without regard to the rating of associated newsgroups, may be used. In addition, the automatic filter need not be used on all newsgroups, but any desired set of newsgroups.

The parental control feature may be combined with the other parental control features of the application, or it may be a separate feature. For example, if newsgroups are given ratings comparable to movies or television shows, then the application (e.g., the program guide) may block access to newsgroups with the same ratings as movies or programs that are blocked. Access to parentally controlled newsgroups may be allowed, for example, to a user who knows a parental control code.

A parent may also specify that the application should block a specific newsgroup or the parent may also specify that the application should block a list of newsgroups. If desired, any newsgroup or other feature of the interactive television application related to a particular category of programming, topics, directors, actors, etc. may be blocked. In addition, the parent may specify a list of keywords to block, whereby any newsgroups containing newsgroup messages containing the specified keywords may be blocked.

Figure 27:
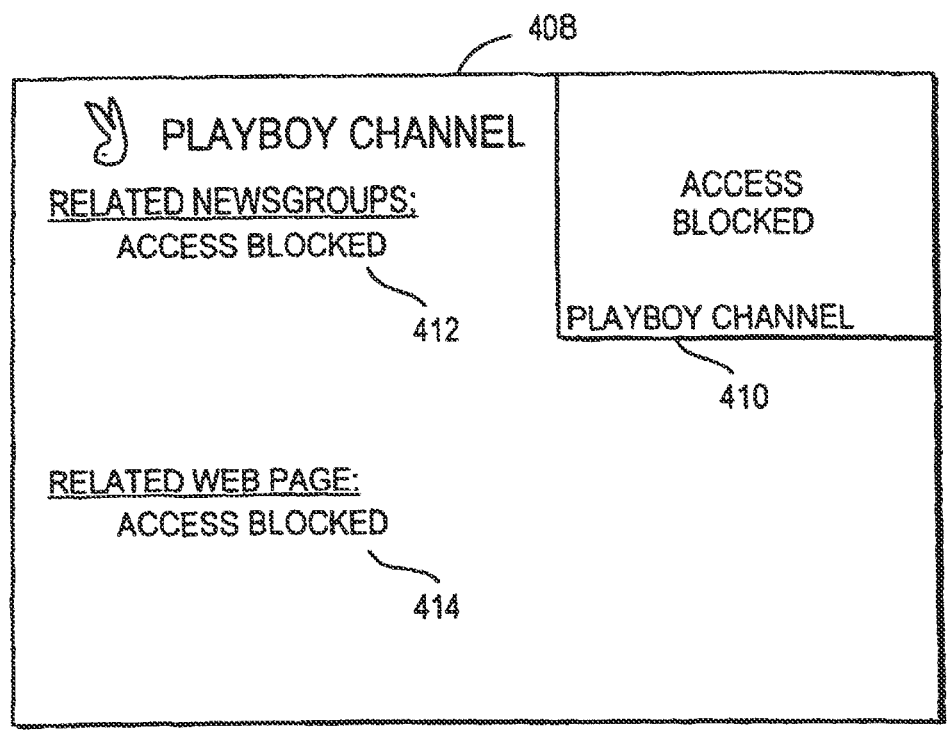
FIG. 27 shows an illustrative interactive television application display screen with parental controls features blocking access to adult material in accordance with the present invention.

FIG. 27 shows an illustrative display screen 408 which may be displayed to a user who does not have access to view adult material. Alternatively, perhaps the parents set the keyword "Playboy" to be parentally controlled. Since television program area 410 is tuned to the Playboy Channel, access to the video for the Playboy Channel may be restricted based on the parental control settings. Similarly, related newsgroup area 412 may be restricted from displaying newsgroups related to Playboy and related newsgroup area may be restricted from providing access to newsgroups related to Playboy. If desired, the newsgroup names may be displayed, but the listings may not be selectable. Other content, such as web content may be blocked. For example, web page link area 414 may be restricted from providing a link to the web pages related to Playboy. The parental control features for the interactive television application is merely illustrative. Any other suitable arrangement may be used.

Figure 28A:
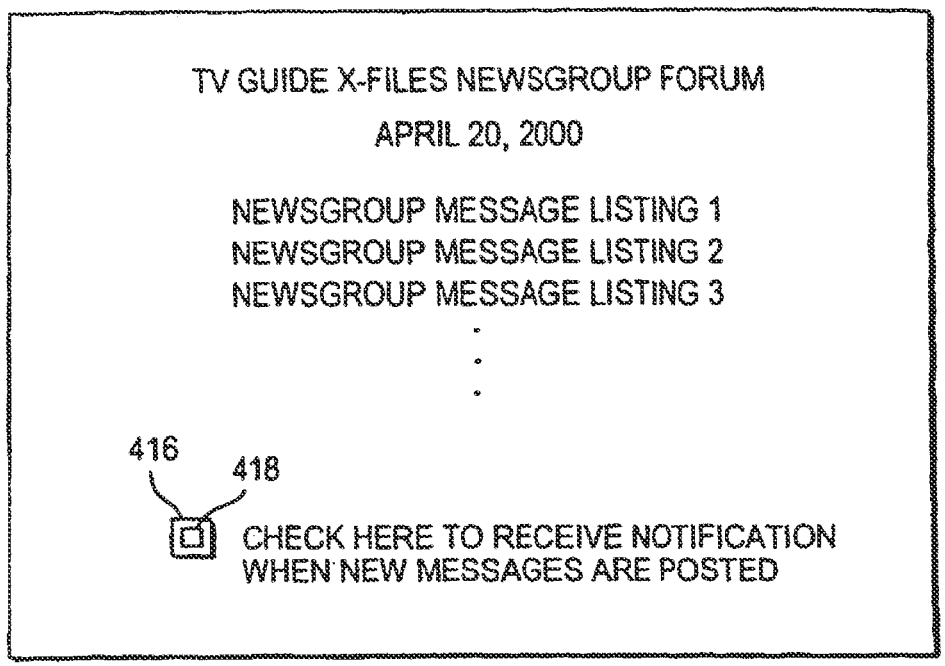
FIG. 28A shows an illustrative interactive television application display screen with an option to receive notification of new newsgroup messages in accordance with the present invention.

Another aspect of the newsgroup feature of the interactive television application includes notification. A user can ask to be notified (e.g., via e-mail) when a new newsgroup message is posted to a particular newsgroup. The notification may result from any new newsgroup message, from a new newsgroup message from a particular user, from a newsgroup message with a particular subject, or from a new newsgroup message with specific keywords. Any other suitable criteria may be used for notification. FIG. 28A illustrates how the user may instruct the interactive television application to send a notification once new newsgroup messages are posted. The user may activate the notification feature by selecting a checkbox 418 (e.g., by placing a highlight region 416 around checkbox 418 and hitting a "select" button on the remote control). This is an illustrative method of activating the notification feature. Any other suitable method may be used.

Figure 28B:
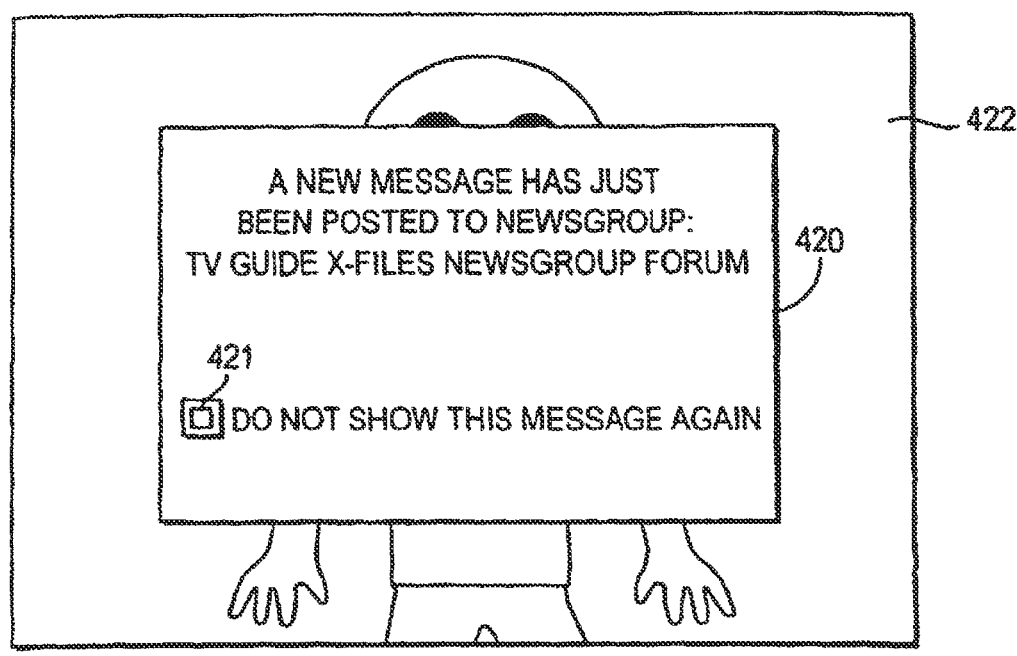
FIG. 28B shows an illustrative interactive television application display screen with a pop-up overlay notifying the user that a new newsgroup message has been posted in accordance with the present invention.

FIG. 28B shows one way in which the user may be notified of new newsgroup messages. A pop-up window 420 may appear over display screen content 422 when a new newsgroup message has been posted in a newsgroup that the user had requested notification for. Pop-up window may also contain a checkbox 421, which the user may select if the user no longer wishes to be notified of new newsgroup messages being posted to that particular newsgroup. This avoids the problem of having too many notifications appearing and becoming a nuisance.

Figure 28C:
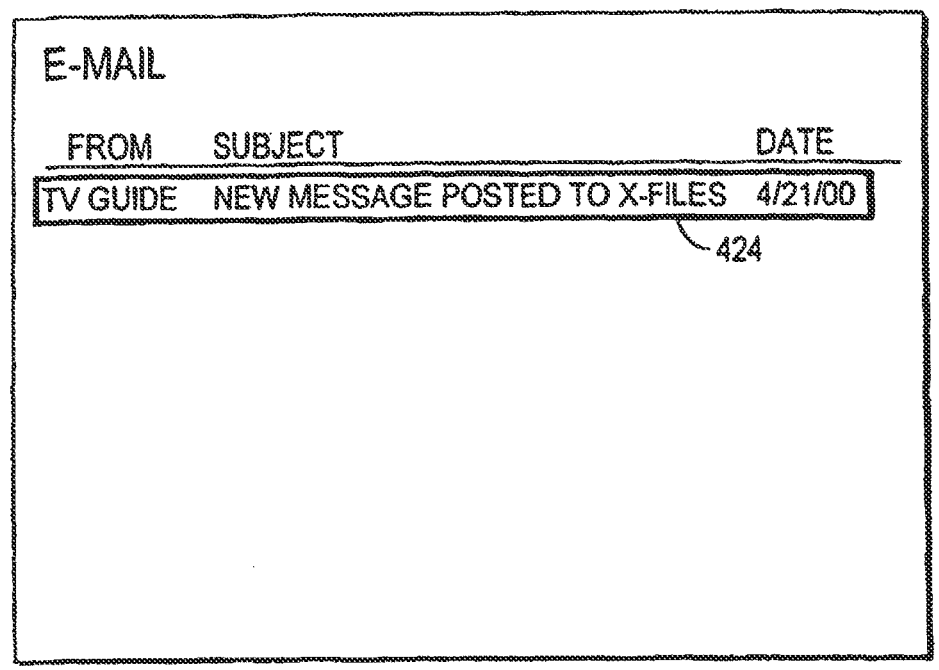
FIG. 28C shows an illustrative interactive television application display screen with an e-mail message listing notifying the user that a new newsgroup message has been posted in accordance with the present invention.
Figure 28D:
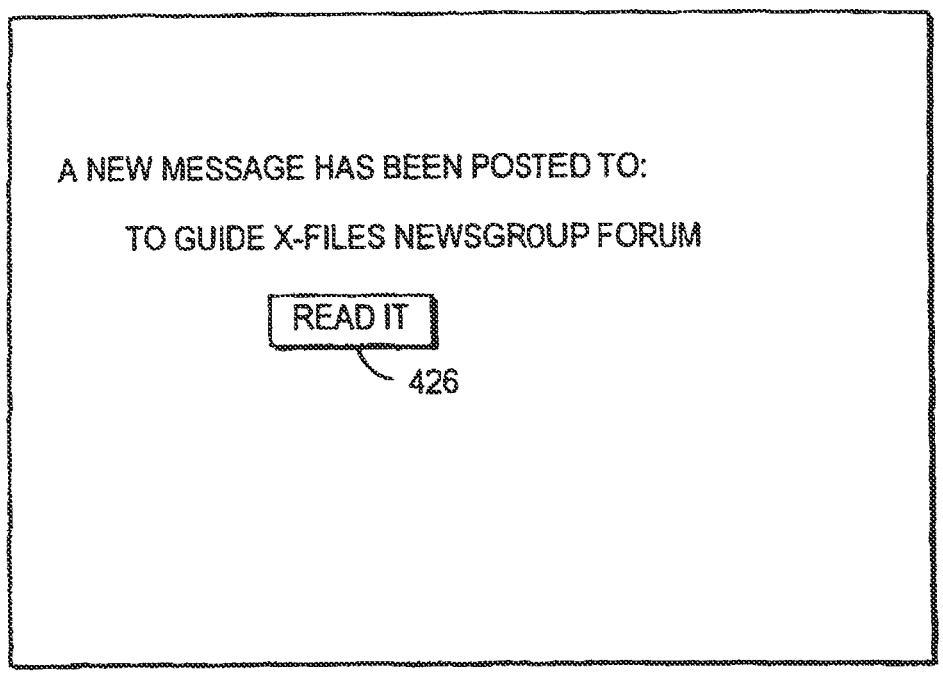
FIG. 28D shows an illustrative interactive television application display screen with the content of the e-mail message listing shown in FIG. 28C in accordance with the present invention.

E-mail may also be used to notify the user of new newsgroup message. FIG. 28C shows an e-mail message listing 424 provided by the interactive television application to notify the user of new newsgroup messages. The user may select e-mail message listing 424. The result of the selection may be that a screen such as that shown in FIG. 28D is displayed. FIG. 28D shows what the content of the selected e-mail message may look like. A note stating that a new message has been posted to the particular newsgroup may be used. A link 426 may also be provided. If the user selects link 426, the newsgroup application may be activated and the new newsgroup message may be opened via the newsgroup application. If desired, the new newsgroup message may be contained entirely within the e-mail notification as illustrated in FIG. 28E. Checkboxes, such as checkbox 421 may be provided within the emails to avoid the nuisance of having too many notifications. These are illustrative methods by which the user may be notified of new newsgroup messages. Any other method of notification may be used. If desired, for example, each user, or each household may have a "home page" that serves as a main page for the interactive television program. An icon may appear on the home page that informs the user that there are new newsgroup messages in a particular newsgroup, in any of the newsgroups in that user's favorite newsgroup list, etc. Any such notification method may be used.

Figure 29:
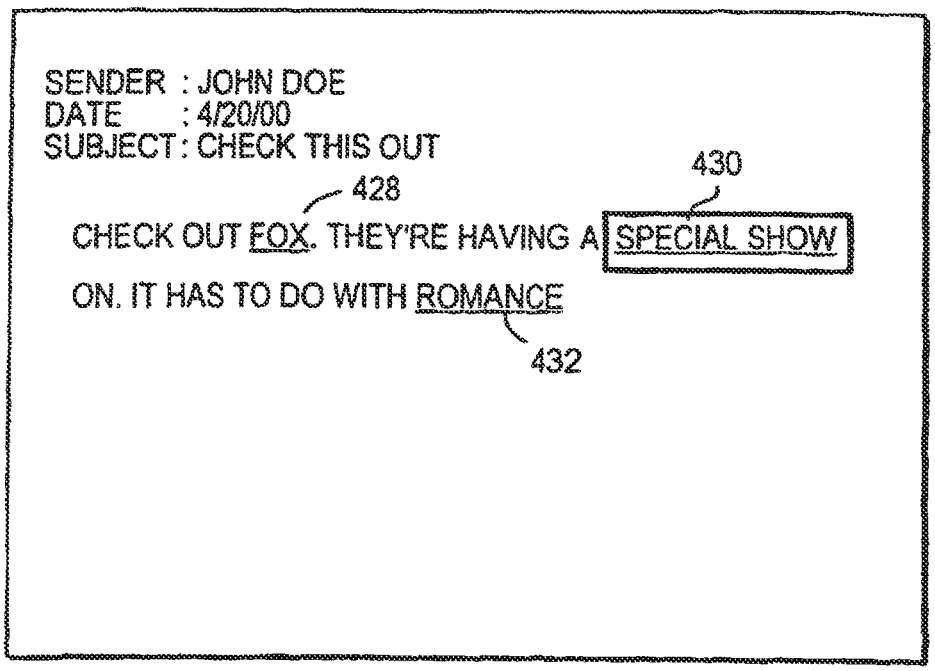
FIG. 29 shows an illustrative interactive television application display screen with a newsgroup message having links to other content in accordance with the present invention.

The newsgroup feature of the interactive television application may allow links to television program, television channels, television categories, etc. to be linked in newsgroup messages. FIG. 29 shows a newsgroup message that incorporated some of these links. For example, if link 428 is selected, the interactive television application may tune the set-top box to a FOX channel. If link 430 is selected, the interactive television application may tune to the special show being referred to, or if the show is not currently airing, an information screen may be displayed about the special show. If link 432 is selected, then the interactive television application may provide the user with a screen including content and links related to romance. This is merely illustrative. Any other suitable method for providing a user direct access to referenced material from newsgroup messages may be used.

Furthermore, if the interactive television application supports such features, the user may be given the ability to set reminders, purchase products, set parental controls, add to a profile, schedule a recording, or otherwise act on a referenced program channel or other referenced programming item.

Figure 30:
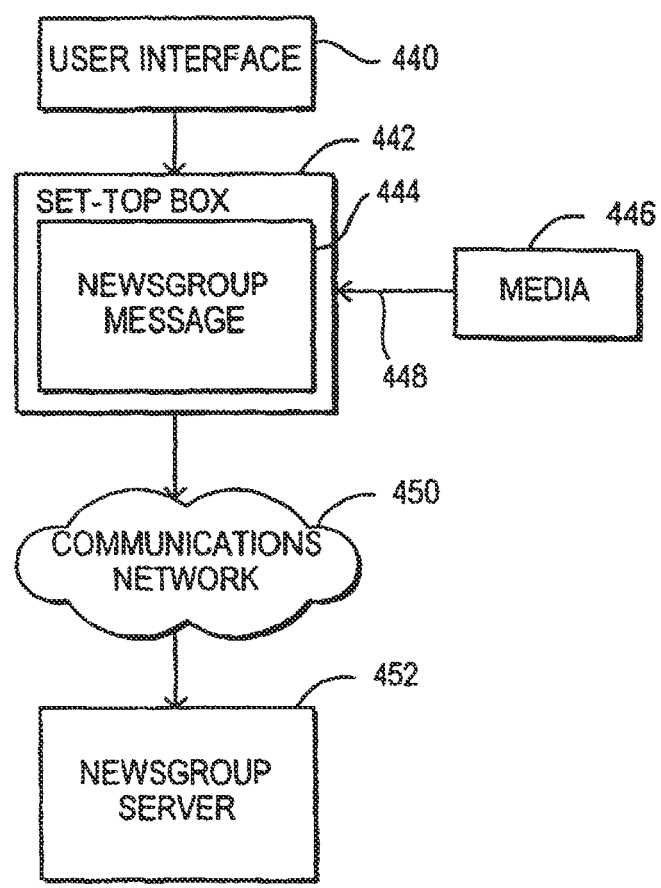
FIG. 30 is diagram of an illustrative system for posting newsgroup messages to a newsgroup server in accordance with the present invention.

The interactive television application may allow the user to reply to a newsgroup message or post a new newsgroup message. A newsgroup message posted by the user may include text, but may contain other content if desired. FIG. 30 is an illustrative system, whereby the user may post a newsgroup message 444 to a newsgroup server 452. Using an input interface 440 (e.g., wireless keyboard, on-screen keyboard, etc.), the user may enter text into the message body of the newsgroup message 444. Newsgroup message 444 may be stored locally in the memory of set-top box 442. If desired, the user may add additional content to newsgroup message 444 using media 446. For example, media 446 may be audio/video clips previously recorded by the user on a local or remote digital server. The clips may also be available from a library of audio/video clips provided by the interactive television application. If desired, media 446 may also include imported media, such as graphics, video, audio, etc., if the platform has such a capability (e.g., having a connection 448 capable of interfacing with an IEEE 1394 port for retrieving data from a camcorder or from a digital camera). Any other suitable source of media 446 may be used.

Figure 31:
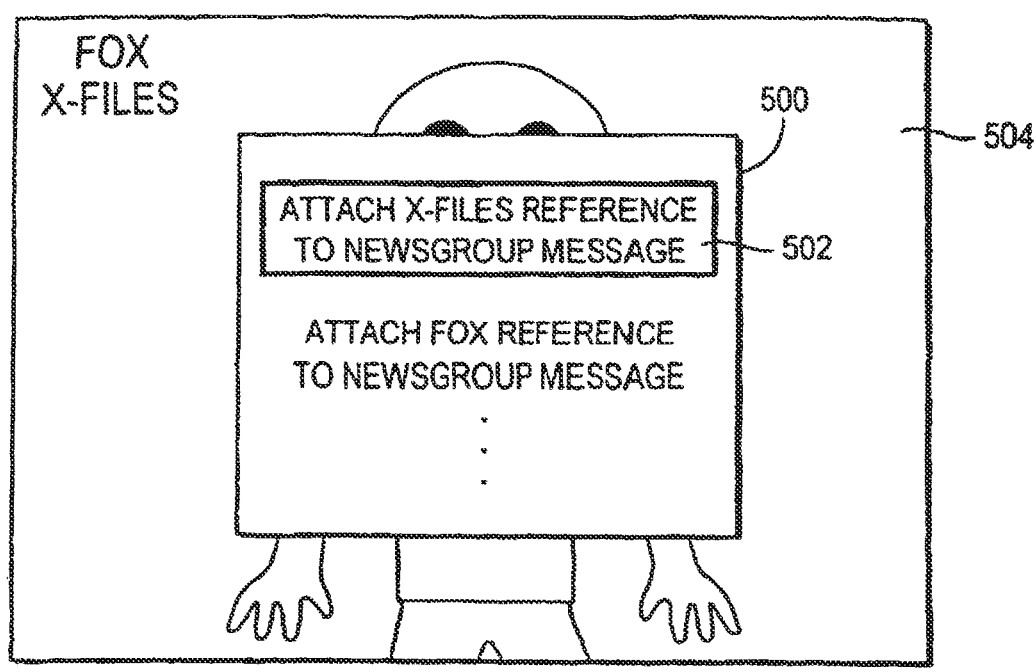
FIG. 31 shows an illustrative interactive television application display screen with options allowing a user to attach references to a newsgroup message in accordance with the present invention.

A user may attach a reference to a particular program, channel, or other programming entity to a newsgroup message. A recipient of that newsgroup message may be able to easily access a description of that item, and act on it (e.g., set a reminder, purchase a product, lock, tune, record, etc.). A recipient of that newsgroup message via the Internet access may just see a text description of the item. References may be attached to a newsgroup message by the user in any suitable way. For example, as the user is viewing content provided by the interactive television application, such as a television program, the user may issue a command (using, for example, a "news" button on the remote control) that would give the user the option of creating a new newsgroup message with a reference to the television program currently being viewed. This is illustrated in FIG. 31. The user may be viewing a television program 504 during which time the user may press a "news" button on the remote control that causes one or more options to appear, perhaps in the form of listings in an overlay 500. The user may choose one or more listings 502 that would allow the user to create a new newsgroup message that may have the selected references attached to it.

Figure 32:
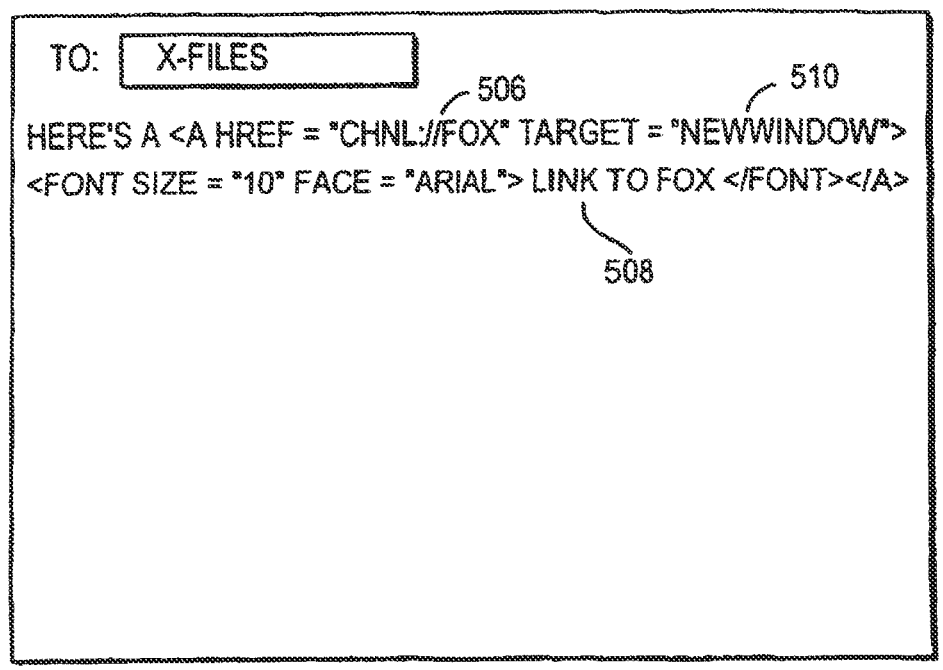
FIG. 32 shows an illustrative interactive television application display screen containing a newsgroup message being written using codes to reference other content in accordance with the present invention.

Alternatively, references may be attached by the user using codes in the newsgroup message itself. For example, hypertext markup language (HTML) may be used in the newsgroup messages whereby a link may be created using an "HREF" statement or a similar statement. This is illustrated in FIG. 32. A link 506 may be encoded into text 508 so that when another user is reading the newsgroup message and selects text 508, the content of link 506 may be displayed. If desired, other options such as a target option may be provided which may allow the author of the newsgroup message to specify a destination for the content of link 506 once it has been selected. Target 510 may specify that the content of link 506 be displayed in a new window. Any such use of coding or programming may be used by the user to write newsgroup messages. Furthermore, any such suitable method of attaching references to newsgroup messages may be used.

If desired, the interactive television application may produce the HTML (or other suitable code). This may allow the user to create newsgroup messages containing enhanced features without the need to know how to code such features and without the need to know the particular syntax of the language being used to code such features. This aspect of the interactive television application may be implemented by allowing the user to use options (e.g., in the form of icons, menu listings, etc.) to direct the interactive television application to create and embed appropriate code.

Figure 33A:
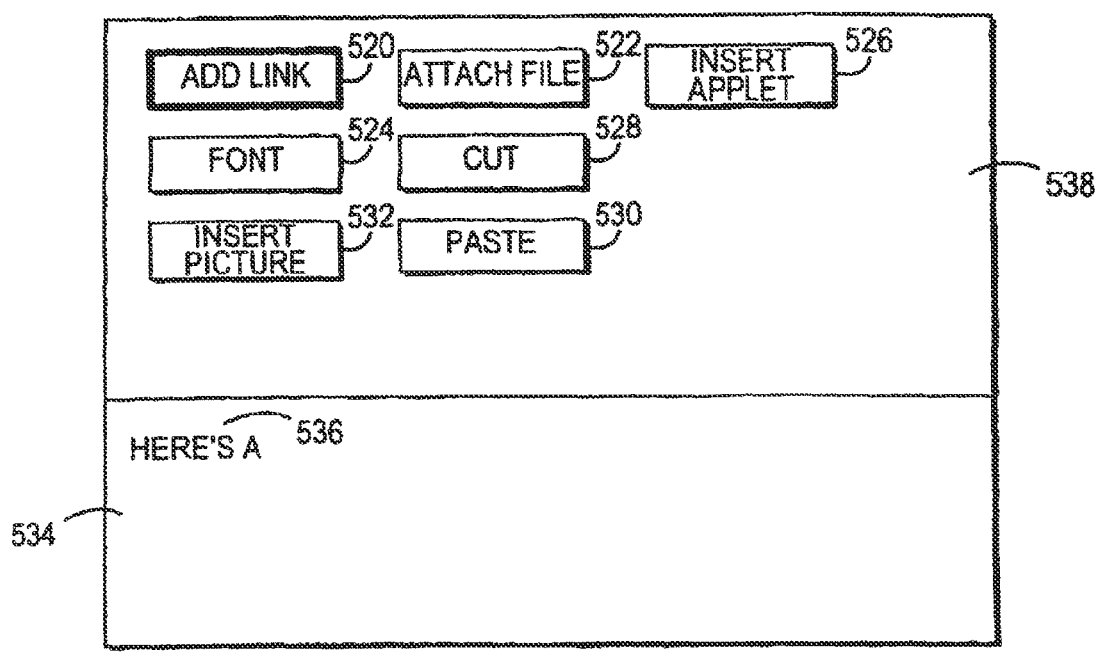
FIG. 33A shows an illustrative interactive television application display screen containing a newsgroup message being written using codes generated by the interactive television application in accordance with the present invention.
Figure 33B:
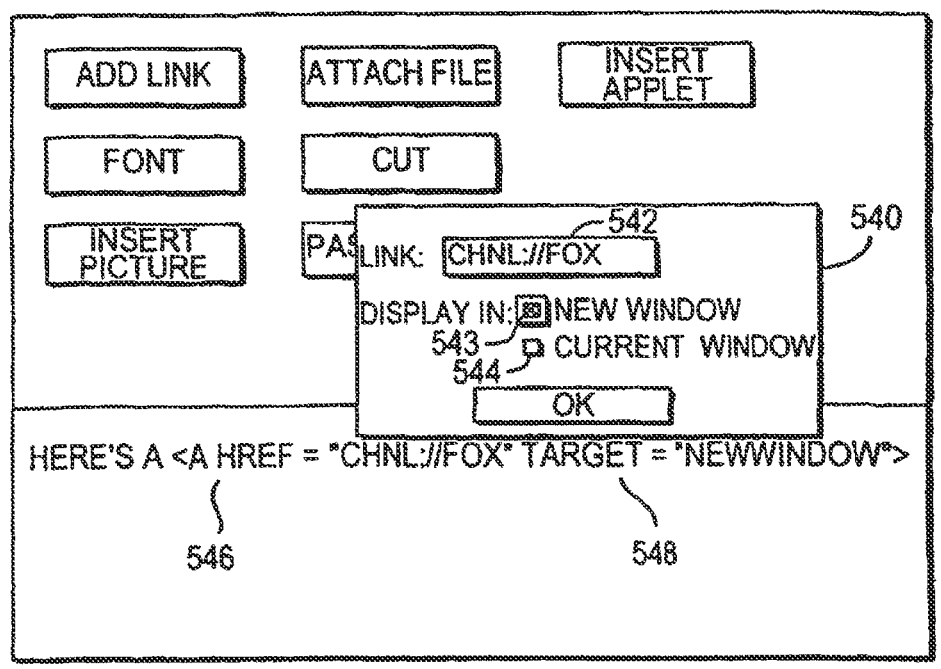
FIG. 33B shows the illustrative interactive television application display screen in FIG. 33A after the user selected one of the displayed options in accordance with the present invention.

FIG. 33 illustrates how the user may select option icons 520, 522, 524, 526, 528, 530, and 532 to insert enhanced features into a newsgroup message. The user may type the newsgroup message 536 in text area 534. If the user wishes to incorporate enhanced features into the newsgroup message, the user may select an icon from options area 538. For example, if the user wishes to insert a link to FOX, the user may select add link icon 520. This may bring up an overlay as illustrated in FIG. 33B.

Overlay 540 may prompt the user to enter the link 542 the user wishes to insert into the newsgroup message 536. Other options may be provided to the user, such as allowing the user to select a target for the content of link 542. For example, checkboxes 542 and 544 may allow the user to select to display the content of link 542 in a new window on the display screen or in the current window, respectively. As the user enters information, the code may be automatically produced by the interactive television application. The code may be automatically displayed in text area 534. For example, after the user enters link 542, code 546 associated with link 542 may be automatically generated and displayed by the interactive television application. Likewise, after the user selects checkbox 542, the corresponding target code 548 may be automatically generated and displayed by the interactive television application. If desired, any text, including code, may be edited by the user.

This is an illustrative method in which the interactive television application may provide the user with tools in which to create newsgroup messages. Any other suitable method may be used to provide these tools. Furthermore, any other suitable tools may be provided other than, or in combination with, those illustrated.

A user may be able to request that an existing newsgroup (e.g., one that is accessible via the Internet) be made available to the interactive television application. A user may also be able to create a new newsgroup that is accessible to the public. This new newsgroup may be hosted on a server related to the interactive television application, located, for example, at the television distribution facility.

Figure 34:
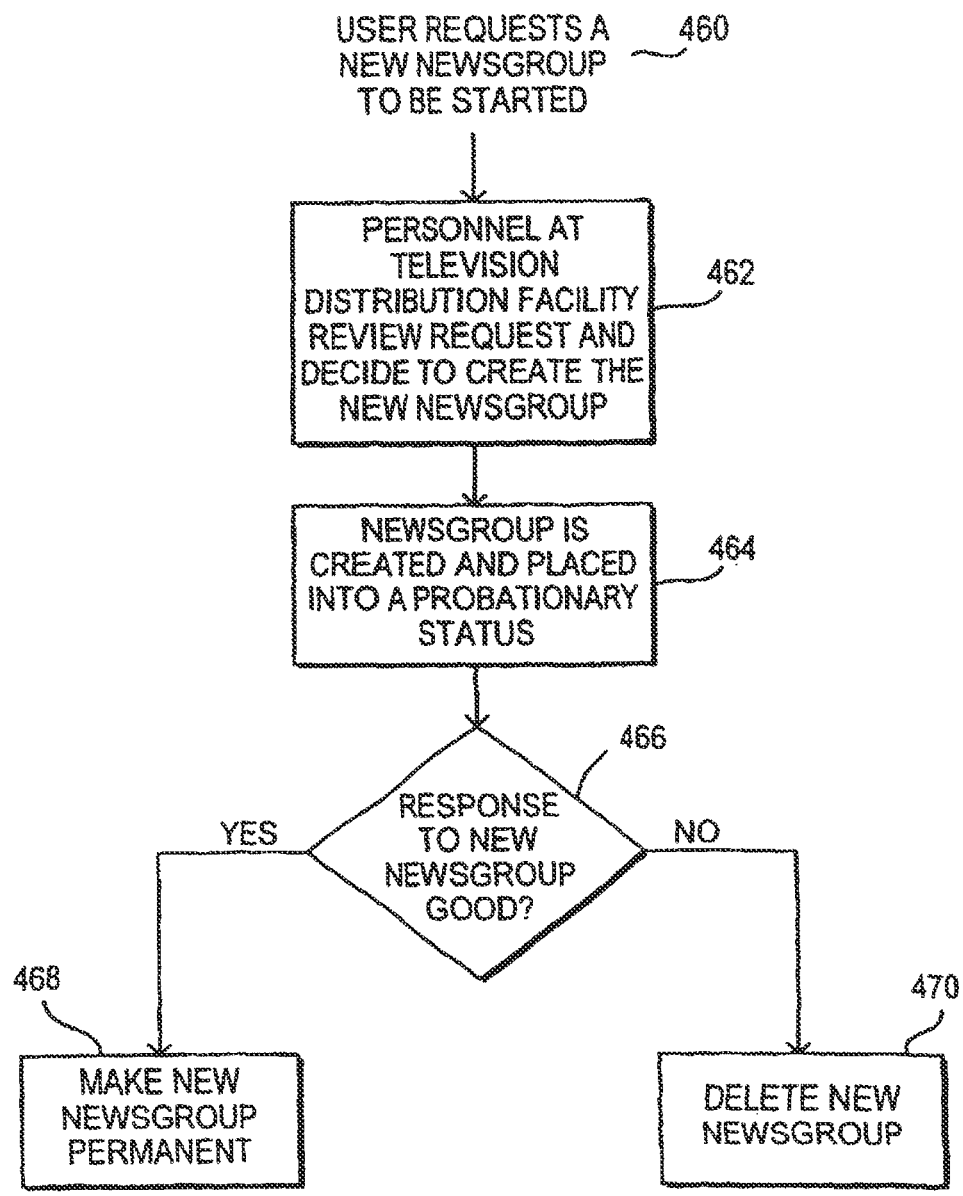
FIG. 34 is a flow chart of illustrative steps involved in creating a new newsgroup in accordance with the present invention.

FIG. 34 shows an illustrative method for creating new newsgroups. The user may request that a particular new newsgroup be created at step 460. In response, personnel at the television distribution facility may review the request for a new newsgroup (step 462). The request may be rejected, in which case the new newsgroup is not created. The request may, on the other hand, be approved, in which case the new newsgroup may be created (step 464). The new newsgroup may be initially placed into a probationary status. At step 466 it is determined whether the response to the new newsgroup is good enough to remove it from the probationary status. This may be accomplished through examination of user comments in the newsgroup messages, through determining whether the number of newsgroup messages in the new newsgroup after a predetermined period of time is acceptable, or through any other suitable means for determining whether a newsgroup is good. If it is determined that the new newsgroup is good, then the new newsgroup may be made permanent at step 468. If the new newsgroup is not good, then it may be deleted at step 470. This is merely an illustrative method for creating newsgroups. Any other suitable method may be used.

The foregoing is merely illustrative of the principles of this invention and various modifications can be made by those skilled in the art without departing from the scope and spirit of the invention.

What is claimed is:

1. A method for providing Internet content related to a media listing, the method comprising:
   cross-referencing a plurality of media listings stored in a listings database with Internet content stored in an Internet database, the cross-referencing comprising:
      searching the Internet database for Internet content related to one or more of the plurality of media listings stored in the listings database;
      identifying first Internet content related to a first media listing of the plurality of media listings based on the searching; and
      generating an association between the first media listing and the identified first Internet content related to the first media listing; and
   storing the association in a cross-reference database, wherein the cross-reference database is distinct from the Internet database and the listings database.

2. The method of claim 1, wherein identifying the first Internet content related to the first media listing comprises determining that the first Internet content is related in subject matter to the first media listing.

3. The method of claim 2, wherein the subject matter is determined based on at least one of: a media asset, a media asset source, a media asset category, an actor, and a director.

4. The method of claim 1, further comprising:
   automatically modifying the cross-reference database based on second Internet content that becomes available after storing the association between the first media listing and the identified first Internet content, wherein the modifying comprises storing an association in the cross-reference database between the first media listing and the second Internet content.

5. The method of claim 1, wherein the Internet content stored in the Internet database comprises at least one of Internet listings, Internet message listings, and Internet messages.

6. The method of claim 1, further comprising:
   retrieving the first Internet content from the Internet database, wherein the first Internet content is retrieved based on an association stored in the cross-reference database between the retrieved Internet content and a media asset that is currently displayed on a display device.

7. The method of claim 6, further comprising:
   generating a display of the media asset in a first section of the display device and the retrieved Internet content in a second section of the display device.

8. The method of claim 7, further comprising generating a display of an interactive advertisement in a third section of the display device.

9. The method of claim 7, further comprising:
generating a display of other content in a third section of the display, wherein the other content and the retrieved Internet content are related in subject matter.

10. The method of claim 9, wherein the other content comprises at least one of: text, graphics, images, video, and media.

11. A system for providing Internet content related to a media listing, the system comprising control circuitry configured to:
cross-reference a plurality of media listings stored in a listings database with Internet content stored in an Internet database, the cross-referencing comprising:
searching the Internet database for Internet content related to one or more of the plurality of media listings stored in the listings database;
identifying first Internet content related to a first media listing of the plurality of media listings based on the searching; and
generating an association between the first media listing and the identified first Internet content related to the first media listing; and
store the association in a cross-reference database, wherein the cross-reference database is distinct from the Internet database and the listings database.

12. The system of claim 11, wherein identifying the first Internet content related to the first media listing comprises determining that the first Internet content is related in subject matter to the first media listing.

13. The system of claim 12, wherein the subject matter is determined based on at least one of: a media asset, a media asset source, a media asset category, an actor, and a director.

14. The system of claim 11, wherein the control circuitry is further configured to:
automatically modify the cross-reference database based on second Internet content that becomes available after the association between the first media listing and the identified first Internet content is stored, wherein the modifying comprises storing an association in the cross-reference database between the first media listing and the second Internet content.

15. The system of claim 11, wherein the Internet content stored in the Internet database comprises at least one of Internet listings, Internet message listings, and Internet messages.

16. The system of claim 11, wherein the control circuitry is further configured to:
retrieve the first Internet content from the Internet database, wherein the first Internet content is retrieved based on an association stored in the cross-reference database between the retrieved Internet content and a media asset that is currently displayed on a display device.

17. The system of claim 16, wherein the control circuitry is further configured to:
generate a display of the media asset in a first section of the display device and the retrieved Internet content in a second section of the display device.

18. The system of claim 17, wherein the control circuitry is further configured to:
generate a display of an interactive advertisement in a third section of the display device.

19. The system of claim 17, wherein the control circuitry is further configured to:
generate a display of other content in a third section of the display, wherein the other content and the retrieved Internet content are related in subject matter.

20. The system of claim 19, wherein the other content comprises at least one of: text, graphics, images, video, and media.

\* \* \* \* \*